United States Patent
Higuchi et al.

(10) Patent No.: US 8,234,920 B2
(45) Date of Patent: Aug. 7, 2012

(54) ANGULAR VELOCITY SENSOR HAVING DRIVE MEMBER COUPLING BEAM SPACED APART FROM DRIVE MEMBERS

(75) Inventors: Hirofumi Higuchi, Okazaki (JP); Tetsuo Fujii, Toyohashi (JP); Masaki Inoue, Obu (JP)

(73) Assignee: DENSO CORPORATION, Kariya (JP)

( * ) Notice: Subject to any disclaimer, the term of this patent is extended or adjusted under 35 U.S.C. 154(b) by 448 days.

(21) Appl. No.: 12/585,052

(22) Filed: Sep. 1, 2009

(65) Prior Publication Data

US 2010/0050767 A1   Mar. 4, 2010

(30) Foreign Application Priority Data

Sep. 2, 2008  (JP) ................. 2008-224824

(51) Int. Cl.
*G01P 9/04* (2006.01)
*G01C 19/56* (2006.01)
(52) U.S. Cl. ................... 73/504.12; 73/504.14
(58) Field of Classification Search ............... 73/504.12, 73/504.14, 504.04, 504.16, 504.02
See application file for complete search history.

(56) References Cited

U.S. PATENT DOCUMENTS

| | | | |
|---|---|---|---|
| 5,604,312 A | 2/1997 | Lutz | |
| 7,093,487 B2 * | 8/2006 | Mochida | 73/504.14 |
| 7,210,347 B2 * | 5/2007 | Nicu et al | 73/504.12 |
| 7,513,155 B2 * | 4/2009 | Jeong et al. | 73/504.02 |
| 7,770,451 B2 * | 8/2010 | Jeong et al. | 73/504.14 |
| 2003/0154788 A1 | 8/2003 | Willig et al. | |
| 2003/0164040 A1 | 9/2003 | Willig et al. | |
| 2003/0183007 A1 | 10/2003 | Willig et al. | |
| 2010/0000321 A1 | 1/2010 | Neul et al. | |

FOREIGN PATENT DOCUMENTS

| | | |
|---|---|---|
| JP | A-2004-518969 | 6/2004 |
| JP | A-2004-518971 | 6/2004 |
| JP | A-2007-248152 | 9/2007 |
| JP | A-2007-333467 | 12/2007 |
| JP | A-2010-501829 | 1/2010 |

OTHER PUBLICATIONS

Office Action dated Jun. 22, 2010 from the Japan Patent Office in corresponding Japanese Application No. 2008-224824.
Office Action mailed Jun. 22, 2010 issued from the Japan Patent Office for corresponding Japanese patent application No. 2008-224824.

* cited by examiner

Primary Examiner — Helen C. Kwok
(74) Attorney, Agent, or Firm — Posz Law Group, PLC

(57) ABSTRACT

An angular velocity sensor includes first and second oscillators and a coupling beam. The coupling beam couples the first and second oscillators together in such a manner that the first and second oscillators vibrate relative to each other in a predetermined direction. The coupling beam includes a first post portion joined to a surface of the first oscillator, a second post portion joined to a surface of the second oscillator, and a spring portion that joins the first post portion to the second post portion. The spring portion is spaced from the first and second oscillators and has elasticity in the predetermined direction.

38 Claims, 20 Drawing Sheets

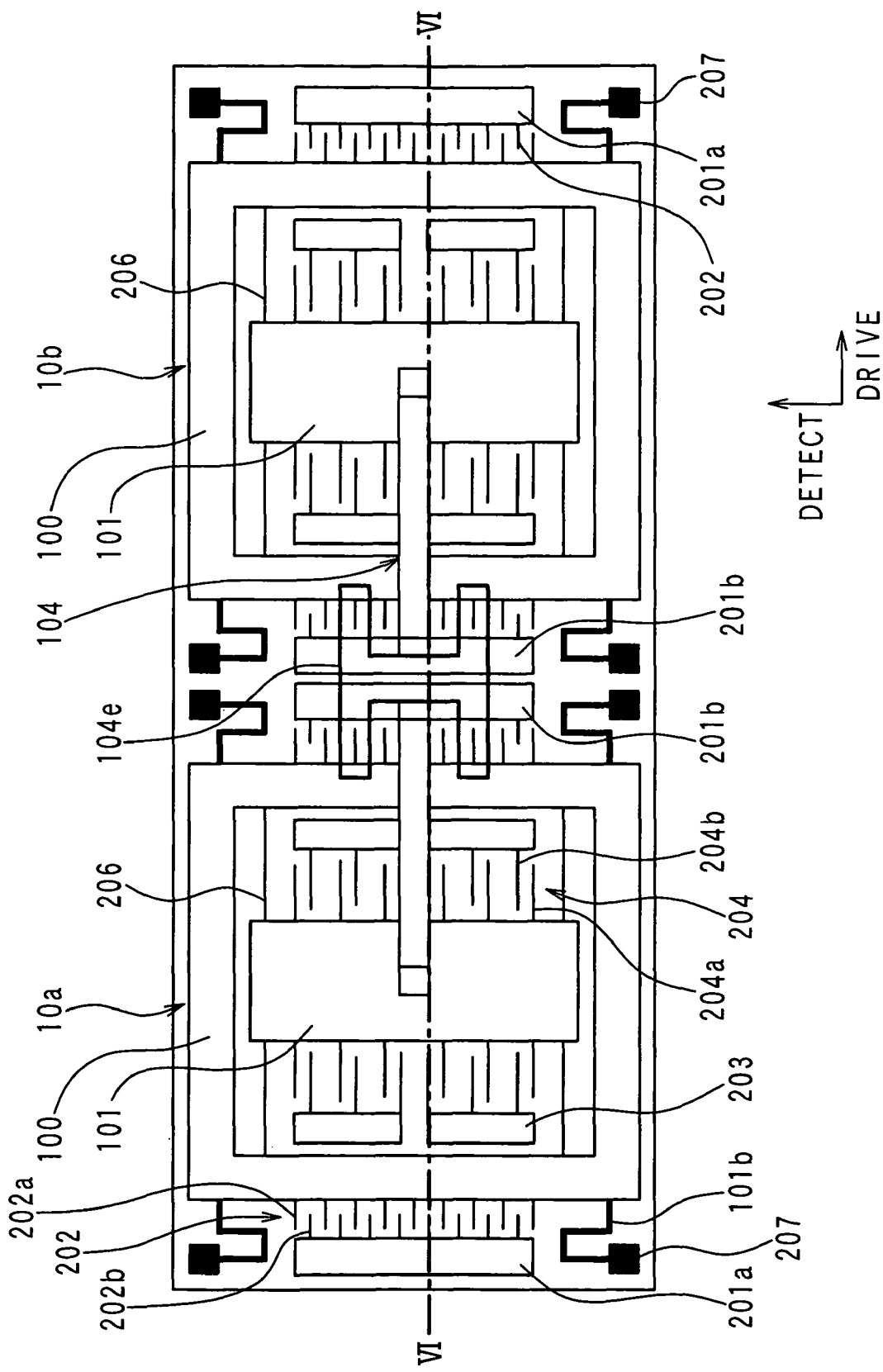

ANGULAR VELOCITY SENSOR HAVING DRIVE MEMBER COUPLING BEAM SPACED APART FROM DRIVE MEMBERS

CROSS REFERENCE TO RELATED APPLICATION

This application is based on and incorporates herein by reference Japanese Patent Application No. 2008-224824 filed on Sep. 2, 2008.

FIELD OF THE INVENTION

The present invention relates generally to angular velocity sensors and, in particular, a vibration-type angular velocity sensor that includes oscillators and a coupling beam for causing a coupling vibration between the oscillators.

BACKGROUND OF THE INVENTION

In a vibration-type angular velocity sensor, an oscillator vibrates in a predetermined direction (hereinafter called a "drive direction"). When angular velocity about an axis perpendicular to the drive direction is applied to the oscillator, Coriolis force proportional to the applied angular velocity is generated in a direction (hereinafter called a "detection direction") perpendicular to each of the drive direction and the axis. The angular velocity is measured by detecting the Coriolis force.

In one method of detecting the Coriolis force, the Coriolis force is detected as inertial force. That is, in the method, a weight member movable in the detection direction is used, and the Coriolis force is detected by detecting the amount of displacement of the weight member caused by the Coriolis force.

It is noted that the weight member can be displaced in the detection direction even when acceleration unrelated to the Coriolis force is applied to the weight member. Therefore, to calculate the angular velocity from the Coriolis force, the displacement caused by the Coriolis force needs to be separated from the displacement caused by the acceleration.

U.S. Pat. No. 5,604,312 corresponding to JP-A-2007-101553 discloses a technique for separating the displacement caused by the Coriolis force from the displacement caused by the acceleration to detect the displacement caused by the Coriolis force. In a vibration-type angular velocity sensor disclosed in U.S. Pat. No. 5,604,312, two oscillators are mechanically coupled together by a spring-shaped beam (hereinafter called a "coupling beam") that is soft in the drive direction. The oscillators are driven to vibrate at the same frequency but in opposite phase. A detection weight movable in the detection direction is provided inside each oscillator and connected to the oscillator. Thus, while the oscillator vibrates and is displaced in the drive direction, the detection weight is displaced in the drive direction with vibration of the oscillator and also displaced in the detection direction according to the Coriolis force.

The vibration-type angular velocity sensor disclosed in U.S. Pat. No. 5,604,312 uses the principal that the amount of displacement of the detection weight due to the Coriolis force is proportional to the angular velocity applied to the detection weight and the vibration speed of the detection weight in the drive direction. In the vibration-type angular velocity sensor, since the two oscillators vibrate in opposite directions (i.e., in opposite phase), the two detection weights are displaced in opposite directions according to the applied angular velocity. In this way, by causing the two oscillators to vibrate in opposite phase, the Coriolis forces are generated at the two detection weights in opposite phase synchronously with the drive frequency. It is noted that when acceleration is applied in the detection direction, the two detection weights are displaced in the drive direction by the same amount regardless of the drive frequency. Therefore, in the vibration-type angular velocity sensor, the displacement caused by the Coriolis force is separated from the displacement caused by the acceleration by sampling a difference between the amounts of displacement of the two oscillators in the detection direction.

According to the vibration-type angular velocity sensor disclosed in U.S. Pat. No. 5,604,312, the two oscillators are flat-shaped oscillators made of a silicon substrate. Further, the coupling beam for coupling the two oscillators are made of the silicon substrate and formed at the same layer as the two oscillators.

Since the oscillators and the coupling beam are formed at the same layer of a silicon substrate, other functional portions such as drive electrodes and additional coupling beams cannot be formed between the oscillators.

SUMMARY OF THE INVENTION

In view of the above, it is an object of the present invention to provide an angular velocity sensor in which oscillators are coupled together by a coupling beam that is formed at a layer different from a layer where the oscillators are formed.

According to a first aspect of the present invention, an angular velocity sensor includes a first sensor unit, a second sensor unit, and a coupling beam. The first sensor unit includes first drive member configured to be driven in a first direction, a first detection member configured to move in a second direction perpendicular to the first direction, and a first elastic member configured to join the first drive member to the first detection member. The second sensor unit include a second drive member configured to driven in the first direction, a second detection member configured to move in the second direction, and a second elastic member configured to join the second drive member to the second detection member. The coupling beam is joined to front surfaces of the first and second drive members so that the first and second drive members can be coupled together by the coupling beam. The first coupling beam is spaced from front surfaces of the first and second detection members.

According to a second aspect of the present invention, an angular velocity sensor includes a first sensor unit, a second sensor unit, and a coupling beam. The first sensor unit includes a first drive member configured to be driven in a first direction, a first detection member configured to move in a second direction perpendicular to the first direction, and a first elastic member configured to join the first drive member to the first detection member. The second sensor unit includes a second drive member configured to driven in the first direction, a second detection member configured to move in the second direction, and a second elastic member configured to join the second drive member to the second detection member. The coupling beam is joined to front surfaces of the first and second detection members so that the first and second detection members can be coupled together by the coupling beam. The first coupling beam is spaced from front surfaces of the first and second drive members.

According to a third aspect of the present invention, an angular velocity sensor includes a first oscillator, a second oscillator, and a coupling beam. The first oscillator is configured to vibrate in a predetermined direction. The second oscillator is configured to vibrate in the predetermined direction. The coupling beam is configured to couple the first and second oscillators together in such a manner that the first and second oscillators vibrate relative to each other in the predetermined direction. The coupling beam includes a first post portion joined to a surface of the first oscillator, a second post portion joined to a surface of the second oscillator, and a spring portion having elasticity in the predetermined direction. The first post portion extends away from the surface of the first oscillator in a thickness direction of the first oscillator. The second post portion extends away from the surface of the second oscillator in a thickness direction of the second oscillator. The spring portion joins the first post portion to the second post portion and is spaced from the first and second oscillators.

According to a fourth aspect of the present invention, an angular velocity sensor includes a first oscillator, a second oscillator, and a pair of first and second coupling beams. The first oscillator is configured to vibrate in a predetermined direction. The second oscillator is configured to vibrate in the predetermined direction. The pair of first and second coupling beams are configured to couple the first and second oscillators together in such a manner that the first and second oscillators vibrate relative to each other in the predetermined direction. The first coupling beam includes a first post portion joined to a front surface of the first oscillator, a second post portion joined to a front surface of the second oscillator, and a first spring portion having elasticity in the predetermined direction. The first post portion extends away from the front surface of the first oscillator in a thickness direction of the first oscillator. The second post portion extends away from the front surface of the second oscillator in a thickness direction of the second oscillator. The first spring portion joins the first post portion to the second post portion and is spaced from the front surfaces of the first and second oscillators. The second coupling beam includes a third post portion joined to a back surface of the first oscillator, a fourth post portion joined to a back surface of the second oscillator, and a second spring portion having elasticity in the predetermined direction. The third post portion extends away from the back surface of the first oscillator in the thickness direction of the first oscillator. The fourth post portion extends away from the back surface of the second oscillator in the thickness direction of the second oscillator. The second spring portion joins the third post portion to the fourth post portion and is spaced from the back surfaces of first and second oscillators.

According to a fifth embodiment of the present invention includes at least two sensor units. Each sensor unit includes a drive weight, a detection weight, a middle weight, and a coupling beam. The drive weight is movable in a first direction. The detection weight is movable in a second direction perpendicular to the first direction. The middle weight is located between the drive weight and the detection weight. The middle weight moves in the first direction, when the drive weight moves in the first direction. The middle weight causes the detection weight to move in the second direction, when the middle weight moves in the second direction. The coupling beam is configured to couple the middle weights of the sensor units together by crossing over the drive weights or the detection weights of the sensor units.

BRIEF DESCRIPTION OF THE DRAWINGS

The above and other objectives, features and advantages of the present invention will become more apparent from the following detailed description made with check to the accompanying drawings. In the drawings:

FIG. 5 is a diagram illustrating a top view of an angular velocity sensor according to a second embodiment of the present invention;

DETAILED DESCRIPTION OF THE PREFERRED EMBODIMENTS

First Embodiment

An angular velocity sensor according to a first embodiment of the present invention is described below with reference to FIGS. 1, 2, 3A-3I, and 4A-4G.

Figure 1:
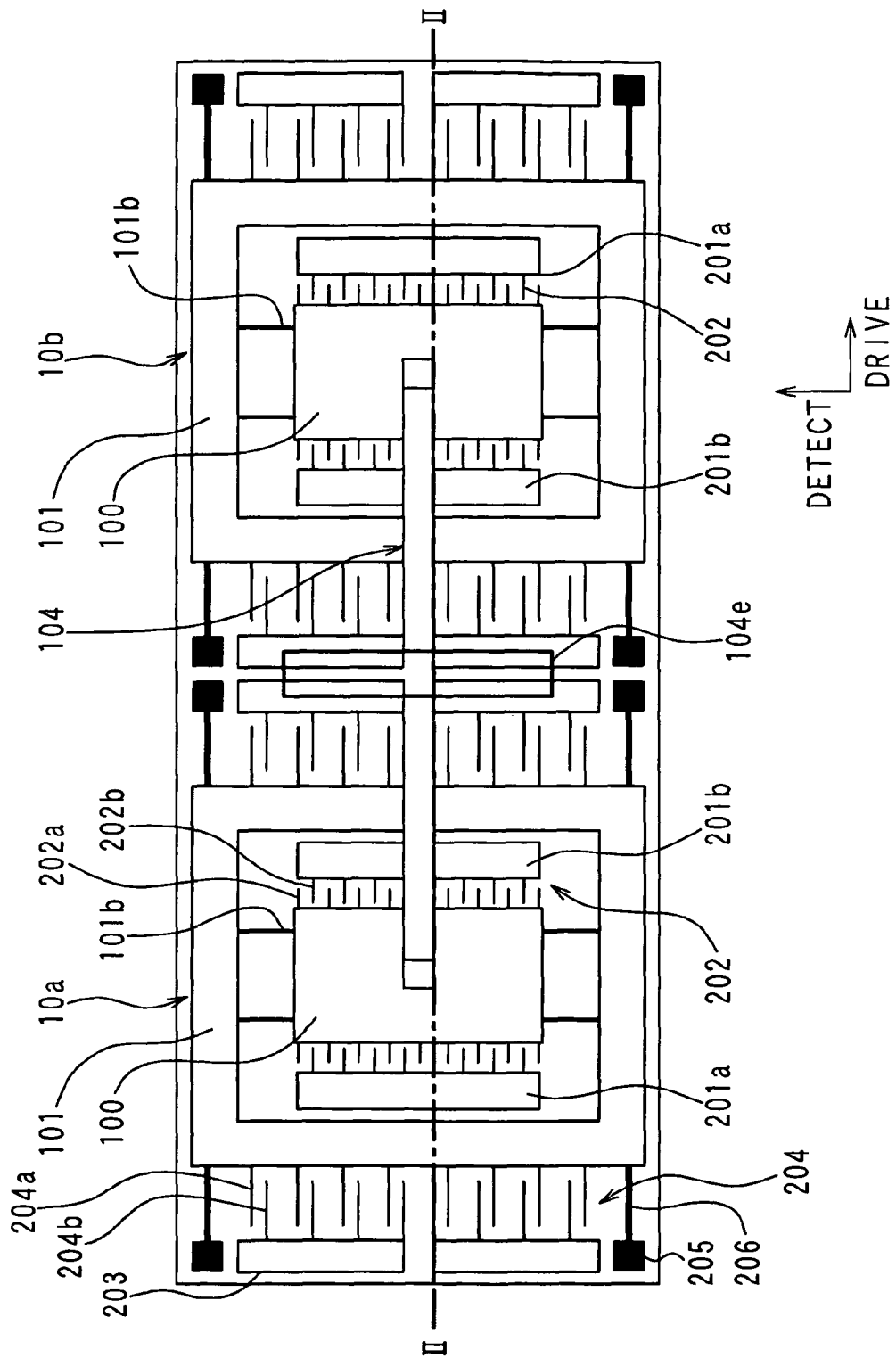
FIG. 1 is a diagram illustrating a top view of an angular velocity sensor according to a first embodiment of the present invention.
Figure 2:
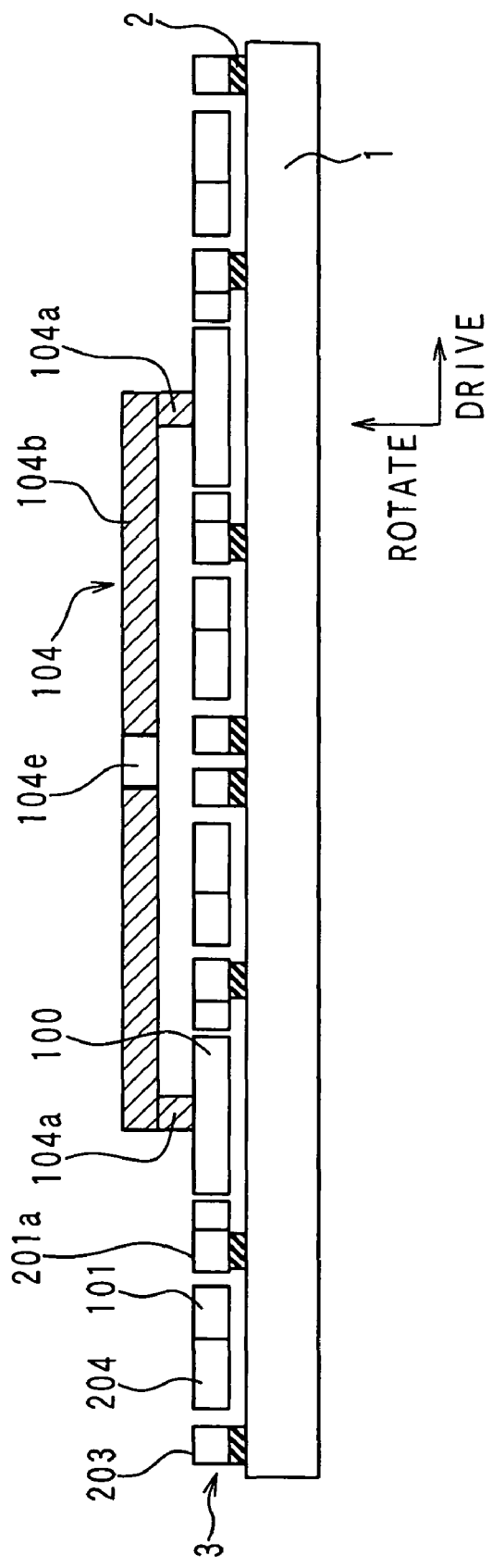
FIG. 2 is a diagram illustrating a cross-sectional view taken along the line II-II in FIG. 1.

FIG. 1 is a top view of the angular velocity sensor, and FIG. 2 is a cross-sectional view taken along the line II-II in FIG. 1. The angular velocity sensor includes two sensor units, i.e., first and second sensor units. Each sensor unit includes a detection weight 101 supported by a detection beam 206. The detection beam 206 is fixed at one end to a substrate layer 1 by a detection beam fixing portion 205. Specifically, the detection weight 101 is supported by the detection beam 206 in such a manner that the detection weight 101 can be displaced in a detection direction shown in FIG. 1 but cannot be displaced in a drive direction shown in FIG. 1. As can be seen from FIG. 1, the drive direction is perpendicular to the drive direction.

The detection weight 101 includes a movable detection electrode 204a that extends in the drive direction to detect displacement of the detection weight 101 in the detection direction. The movable detection electrode 204a is positioned to face a fixed detection electrode 204b in the detection direction. The fixed detection electrode 204b extends from a detection electrode fixing portion 203 in the drive direction. The detection electrode fixing portion 203 is fixed to the substrate layer 1. A separation distance between the movable detection electrode 204a and the fixed detection electrode 204b changes with displacement of the detection weight 101 in the detection direction. Accordingly, a capacitance between the movable detection electrode 204a and the fixed detection electrode 204b changes. The amount of displacement of the detection weight 101 in the detection direction can be measured by detecting the amount of change in the capacitance. The change in the capacitance can be obtained as a voltage value, for example, by using a standard capacitance-to-voltage conversion circuit. The movable detection electrode 204a and the fixed detection electrode 204b form a detection electrode 204.

Each sensor unit further includes a drive weight 100 supported to the detection weight 101 by a drive beam 101b. The drive beam 101b has elasticity in the drive direction so that the drive weight 100 can be displaced relative to the detection weight 101 in the drive direction. It is preferable that the drive weight 100 be configured not to be displaced in the detection direction.

Each sensor unit further includes a tooth-shaped drive electrode 202 for producing drive power that causes the drive weight 100 to vibrate in the drive direction. The drive electrode 202 includes a movable drive electrode 202a extending from the drive weight 100 in the drive direction and a fixed drive electrode 202b extending from a drive electrode fixing portion 201a in the drive direction. The drive electrode fixing portion 201a is fixed to the substrate layer 1. The movable drive electrode 202a and the fixed drive electrode 202b are alternately arranged in the detection direction. Electrostatic attractive force is generated by applying a voltage between the movable drive electrode 202a and the fixed drive electrode 202b so that the drive weight 100 can be attracted toward the fixed drive electrode 202b side. The drive electrode 202 is provided on each side of the drive weight 100 in the drive direction, and the voltage is alternately applied to the drive electrode 202 on one side and the drive electrode 202 on the other side. In such an approach, the drive weight 100 can efficiently vibrate in the drive direction. A movable portion including the drive weight 100 and the detection weight 101 is hereinafter called an "oscillator", and a non-movable portion including the fixed drive electrode 202b and the fixed detection electrode 204b is hereinafter called a "fixed portion".

If an angular velocity about an axis extending in a rotation direction, shown in FIG. 2, perpendicular to each of the drive direction and the detection direction is applied during a period of time the drive weight 100 vibrates in the drive direction (i.e., during a period of time the drive weight 100 has a velocity in the drive direction), Coriolis force proportional to the vibration velocity of the drive weight 100 and the angular velocity is generated in the detection direction. As a result, the drive weight 100 and the detection weight 101 are displaced in the detection direction. Since the Coriolis force is proportional to the vibration velocity of the drive weight 100, the Coriolis force can be increased by increasing the vibration velocity of the drive weight 100. The vibration velocity of the drive weight 100 can be increased by causing the drive weight 100 to vibrate at a resonant frequency of the drive weight 100. When the drive weight 100 vibrates at its resonant frequency, the amplitude of vibration of the drive weight 100 is maximized. Accordingly, the vibration velocity of the drive weight 100 is increased so that the Coriolis force can be increased. When the Coriolis force is increased, the amount of displacement of the detection weight 101 is increased so that the amount of change in the capacitance of the detection electrode 204 can be increased. Thus, the angular velocity sensor has an improved detection accuracy, i.e., has an improved signal to noise ratio (S/N).

It is noted that there is a possibility that external acceleration having an acceleration component in the detection direction may be applied to the angular velocity sensor. In such a case, the detection weight 101 is displaced not only by the Coriolis force but also by the acceleration component. Since the displacement caused by the acceleration component is noise for the displacement caused by the Coriolis force, the displacement caused by the acceleration component degrades the detection accuracy of the angular velocity sensor. Typically, a synchronous detection circuit is used to detect the capacitance change in order to avoid the detection accuracy degradation. The synchronous detection circuit uses the principle that the Coriolis force is generated synchronously with the velocity of the drive weight 100, i.e., synchronously with the drive frequency of the drive weight 100. In the synchronous detection circuit, only a signal component synchronous with the drive frequency of the drive weight 100 is extracted from an output signal representing the capacitance change in the detection direction. In this way, the synchronous detection circuit can remove an acceleration component (i.e., noise) having a frequency different from the drive frequency. However, the synchronous detection circuit cannot remove an acceleration component (i.e., noise) having a frequency equal to the drive frequency. In view of the above, the angular velocity sensor according to the first embodiment is configured to remove not only the acceleration component having the frequency different from the drive frequency but also the acceleration component having the frequency equal to the drive frequency.

As noted previously, the angular velocity sensor according to the first embodiment includes two sensor units. A combination of the two sensor units can remove not only the acceleration component having the frequency different from the drive frequency but also the acceleration component having the frequency equal to the drive frequency. Specifically, the first sensor unit includes a first oscillator 10a (i.e., the drive weight 100 and the detection weight 101) as a movable portion, the fixed portion (i.e., the fixed drive electrode 202b and the fixed detection electrode 204b) as a non-movable portion, the detection beam 206 for supporting the first oscillator 10a to the fixed portion, and the drive beam 101b. Likewise, the second sensor unit includes a second oscillator 10b (i.e., the drive weight 100 and the detection weight 101) as a movable portion, the fixed portion (i.e., the fixed drive electrode 202b and the fixed detection electrode 204b) as a non-movable portion, the detection beam 206 for supporting the second oscillator 10b to the fixed portion, and the drive beam 101b.

The drive weights 100 of the two sensor units are driven to vibrate in opposite phase in the drive direction so that the drive weights 100 can vibrate in opposite direction in the drive direction. Accordingly, a direction in which the Coriolis force is exerted on the drive weight 100 of the first sensor unit is opposite to a direction in which the Coriolis force is exerted on the drive weight 100 of the second sensor unit. As a result, the detection weights 101 of the two sensor units are displaced in opposite direction in the detection direction so that signals representing the capacitance changes of the detection electrodes 204 of the two sensor units can have opposite phase. In contrast, the external acceleration components are exerted on the two sensor units in the same direction including the detection direction. Therefore, the acceleration components as common phase components can be removed by taking a difference between detection signals of the two sensor units using a differential circuit. In this way, only signal components corresponding to the Coriolis force can be extracted from the detection signals.

To use such a differential circuit, there is a need that the Coriolis force components included in the detection signals be in synchronism with each other. That is, there is a need that the drive frequencies of the drive weights 100 of the two sensor units be in synchronism with each other. However, due to., for example, manufacturing variations, it is difficult to manufacture the angular velocity sensor in such a manner that the oscillators 10a, 10b (i.e., the drive weights 100) of the two sensor units have exactly the same resonance frequency.

In view of the fact that it is difficult to manufacture the oscillators 10a, 10b having exactly the same resonance frequency, according to the first embodiment, the two drive weights 100 are mechanically coupled together by a coupling beam 104 that has elasticity in the drive direction. The coupling beam 104 allows the angular velocity sensor to have a resonance vibration mode in which the two drive weights 100 coupled by the coupling beam 104 resonantly vibrate at the same frequency but in opposite phase. That is, when the drive weights 100 are driven in the resonance vibration mode, the drive weights 100 resonantly vibrate at the same frequency but in opposite phase.

When the drive weights 100 resonantly vibrate at the same frequency but in opposite phase, absolute values of the amounts of displacements of the detection weights 101 of the two sensor units caused by the Coriolis force become the same. Therefore, the external acceleration component (i.e., noise) and the Coriolis force component can be separated from each other by using the differential circuit.

The coupling beam 104 includes a pair of post portions 104a, a pair of beam portions 104b, and a center spring portion 104e. The post portions 104a are joined to the drive weights 100 of the two sensor units, respectively. The beam portions 104b are joined to the post portions 104a, respectively. The center spring portion 104e is connected between the beam portions 104b. That is, the post portion 104a, the beam portion 104b, the center spring portion 104e, the beam portion 104b, and the post portion 104a are joined in the mentioned order to form the coupling beam 104 that couples the drive weights 100 together.

The post portion 104a extends from an element forming layer 3 in an upward direction. That is, the post portion 104a is formed by a layer stacked on the element forming layer 3. As described later, the element forming layer 3 provides the drive weight 100 and the detection weight 101.

The beam portion 104b connects the post portion 104a to the center spring portion 104e and extends in the same direction (i.e., in the drive direction) as the element forming layer 3 extends. The beam portion 104b has a thickness in the rotation direction and a width in the detection direction. It is preferable that the beam portion 104b be rigid in the rotation direction and light in weight. Therefore, the thickness of the beam portion 104b is set smaller than the width of the beam portion 104b. In such an approach, the rigidity of the beam portion 104b in the rotation direction is increased, and the weight of the beam portion 104b is reduced. The beam portion 104b overlaps the detection weight 101, the drive electrode fixing portion 201a, and the fixed detection electrode 204b in the rotation direction. In other words, the beam portion 104b is located above the detection weight 101, the drive electrode fixing portion 201a, and the fixed detection electrode 204b in such a manner that there is a clearance between the beam portion 104b and each of the detection weight 101, the drive electrode fixing portion 201a, and the fixed detection electrode 204b.

Both ends of the center spring portion 104e are joined to the beam portions 104b, respectively. The center spring portion 104e has elasticity in each of the drive direction and the detection direction. The center spring portion 104e has a rectangular hollow shape. That is, the center spring portion 104e has four sides. Specifically, a pair of long sides of the center spring portion 104e extends in the detection direction, and a pair of short sides of the center spring portion 104e extends in the drive direction. The amount of displacement of the drive weight 100 in the drive direction caused by the drive vibration is generally greater than the amount of displacement of the drive weight 100 in the detection direction caused by the Coriolis force. Therefore, it is preferable that the center spring portion 104e be deformed easily in the drive direction. According to the first embodiment, since the long sides of the center spring portion 104e extend in the detection direction, the center spring portion 104e can be easily deformed in the drive direction. The center spring portion 104e overlaps the detection electrode fixing portion 203 in the rotation direction. In other words, the center spring portion 104e is located above the detection electrode fixing portion 203 in such a manner that there is a clearance between the center spring portion 104e and the detection electrode fixing portion 203.

It is preferable that the coupling beam 104 be formed at a layer different from a layer where the drive weight 100 and the detection weight 101 are formed. In such an approach, the coupling beam 104 (in particular, the beam portions 104b and the center spring portion 104e) can be configured to cross over the drive electrode 202 and the detection weight 101. Thus, the drive electrode 202 and the detection weight 101 can be formed without interference with the coupling beam 104.

It is noted that since the coupling beam 104 has some mass, when the drive weights 100 are coupled together by the coupling beam 104, the drive weights 100 may be deformed in a direction of gravity due to the weight of the coupling beam 104. That is, due to the weight of the coupling beam 104, the drive weights 100 may be inclined relative to a direction in which the substrate layer 1 extends. To prevent such a problem, it is preferable that the post portion 104a be fixed to the drive weight 100 at a portion corresponding to the center of gravity of the drive weight 100. In such an approach, the coupling beam 104 is supported by the drive weight 100 at the center of gravity of the drive weight 100 so that the inclination of the coupling beam 104 relative to the substrate layer 1 can be reduced.

As described above, according to the first embodiment, the two drive weights 100 can stably vibrate at the same frequency but in opposite phase.

Further, according to the first embodiment, the coupling beam 104 couples the drive weights 100 together by crossing over the detection weight 101, the drive electrode fixing portion 201a, and the detection electrode fixing portion 203. Therefore, the coupling beam 104 can be formed without dividing or eliminating the detection weight 101, the drive electrode fixing portion 201a, and the detection electrode fixing portion 203.

Furthermore, according to the first embodiment, the coupling beam 104 couples together the centers of gravities of the drive weights 100 of the oscillators 10a, 10b of the two sensor units. In such an approach, the weight of the coupling beam 104 is exerted on the center of gravity of the drive weight 100 so that it is less likely that the drive weight 100 is deformed in the direction of gravity due to the weight of the coupling beam 104. Accordingly, degradation in detection accuracy of the angular velocity sensor can be reduced. It is noted that if the drive weight 100 is deformed, the drive weight 100 cannot vibrate in a correct direction. As a result, noise is induced in the detection signal, and the detection accuracy is degraded.

An example of a method of making the angular velocity sensor according to the first embodiment is described below with reference to FIGS. 2, 3A-3I, and 4A-4G.

FIG. 2 is a cross-sectional view taken along the line II-II in FIG. 1 and illustrates the angular velocity sensor in a completed condition.

The method is described in details below. Firstly, in a first process shown in FIG. 3A, a SOI substrate (wafer) 5 is prepared. The SOI substrate 5 is formed by arranging an element forming layer 3 of a single-crystal silicon on a substrate layer 1 of a single-crystal silicon through a silicon oxide layer 2. The silicon oxide layer 2 can serve as a sacrificial layer.

Figure 3A:
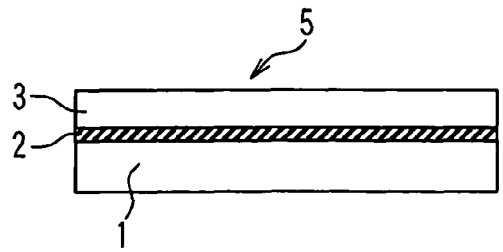
FIGS. 3A-3I are diagram illustrating processes of a method of making the angular velocity sensor.
Figure 3E:
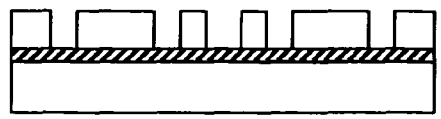
Figure 3B:
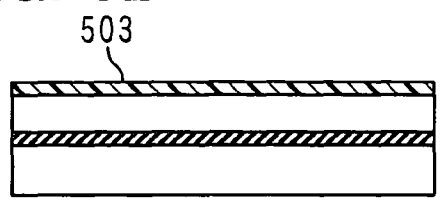

Next, in a second process shown in FIG. 3B, a resist layer 503 is formed on a top surface of the element forming layer 3 of the SOI substrate 5.

Figure 3F:
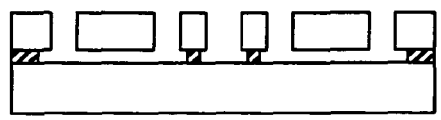
Figure 3C:
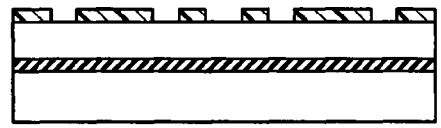

Then, in a third process shown in FIG. 3C, the resist layer 503 is patterned in a predetermined shape corresponding to the drive weight 100 and the detection weight 101 by a photolithography process.

Figure 3G:
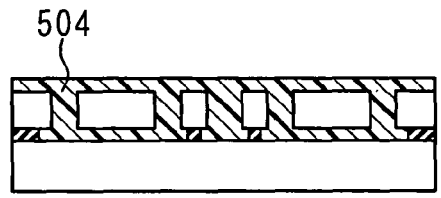
Figure 3D:

Next, in a fourth process shown in FIG. 3D, the drive weight 100 and the detection weight 101 are formed at the element forming layer 3, for example, by a plasma etching process.

Then, in a fifth process shown in FIG. 3E, the resist layer 503 remaining on the element forming layer 3 is removed.

Next, in a sixth process shown in FIG. 3F, the silicon oxide layer 2 is partially removed by an etching process using etchant such as hydrofluoric acid. The element forming layer 3 is fixed to the substrate layer 1 through the remaining silicon oxide layer 2.

Then, in a seventh process shown in FIG. 3G, portions etched in the fourth and sixth processes are filled with a filling member 504. Since there is a need to completely remove the filling member 504 in a post-process, it is preferable that the filling member 504 be a material that can be removed by an etching process or a sublimation process. For example, when the filling member 504 is made of an organic resist material or a polyimide material, the filling member 504 can be removed easily in an oxygen plasma (i.e., in a dry atmosphere). Further, in the seventh process, a surface of the filling member 504 can be planarized. In such an approach, the coupling beam 104 can have a designed thickness, when the coupling beam 104 is formed in a post-process.

Figure 3H:
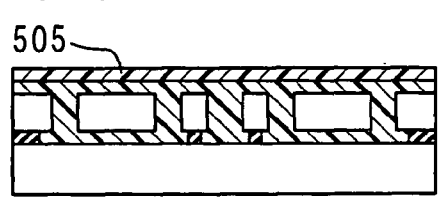

Next, in an eighth process shown in FIG. 3H, a resist 500 is applied to the surface of the filling member 504.

Figure 3I:
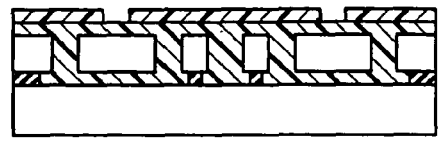

Then, in an ninth process shown in FIG. 3I, an opening is formed in the resist 500 at a position corresponding to the post portion 104a of the coupling beam 104, for example, by a photolithography process.

Figure 4A:
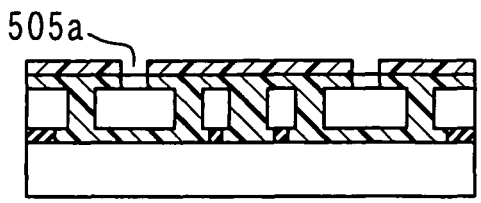
FIGS. 4A-4G are diagram illustrating processes following the processes illustrated in FIGS. 3A-3I.

Next, in a tenth process shown in FIG. 4A, the filling member 504 is etched to form a contact hole 505a corresponding to the post portion 104a of the coupling beam 104.

Figure 4F:
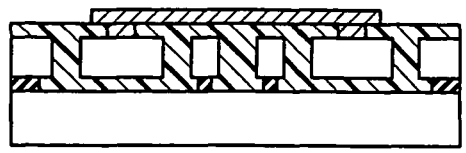
Figure 4B:
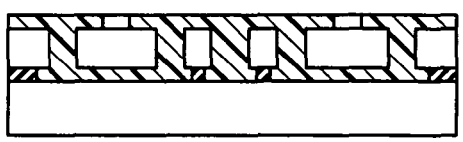

Then, in an eleventh process shown in FIG. 4B, the resist 505 is removed.

Figure 4G:
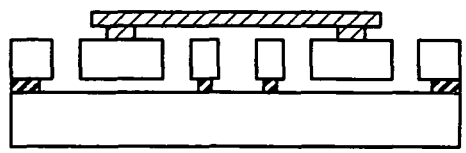
Figure 4C:
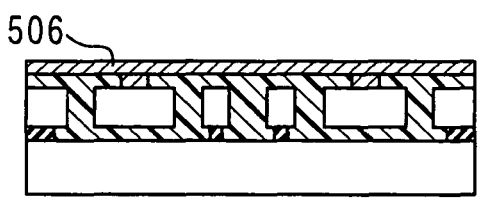

Next, in a twelfth process shown in FIG. 4C, a polysilicon layer 506 as a material for the coupling beam 104 is formed on the filling member 504, for example, by a laminating process. Alternatively, a metal layer instead of the polysilicon layer 506 can be formed on the filling member 504, for example, by a deposition process or a plating process.

Figure 4D:
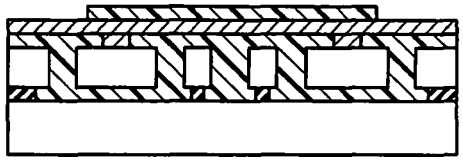

Then, in a thirteenth process shown in FIG. 4D, a resist layer 507 is formed on the polysilicon layer 506 and patterned in a predetermined shape corresponding to the beam portion 104b of the coupling beam 104 by a photolithography process.

Figure 4E:
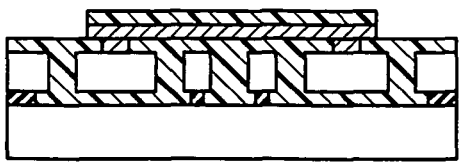

Next, in a fourteenth process shown in FIG. 4E, the polysilicon layer 506 is partially removed by an etching process using the patterned resist layer 507 as a mask. As a result, the polysilicon layer 506 is formed in the shape of the coupling beam 104 so that the coupling beam 104 can be completed.

Then, in a fifteenth process shown in FIG. 4F, the resist layer 507 remaining on the coupling beam 104 is removed.

Next, in a sixteenth process shown in FIG. 4G, the filling member 504 is removed so that the drive weight 100 and the detection weight 101 can move. Finally, for example, an electric potential is supplied to the drive electrode 202 and the detection electrode 204, and an aluminum electrode pad for drawing a detection signal is formed. In this way, the angular velocity sensor according to the first embodiment is completed.

The method describe above is merely one example for making the angular velocity sensor of the first embodiment.

According to the above method, the coupling beam 104 is formed at the polysilicon layer 506 that is different from the element forming layer 3 where the oscillators 10a, 10b (i.e., the drive weight 100 and the detection weight 101) are formed. In such an approach, the coupling beam 104 can be formed by microelectromechanical systems (MEMS) technology in the same manner as the oscillators 10a, 10b. Therefore, the coupling beam 104 can be accurately positioned with respect to the drive weight 100.

Further, according to the above method, the coupling beam 104 is formed under a condition where the movable portion including the drive weight 100 and the detection weight 101 is fixed by the filling member 504. In such an approach, it is less likely that the movable portion is adhered to other portions such as the non-movable portion.

Second Embodiment

An angular velocity sensor according to a second embodiment of the present invention is described below with reference to FIGS. 5 and 6.

Figure 6:
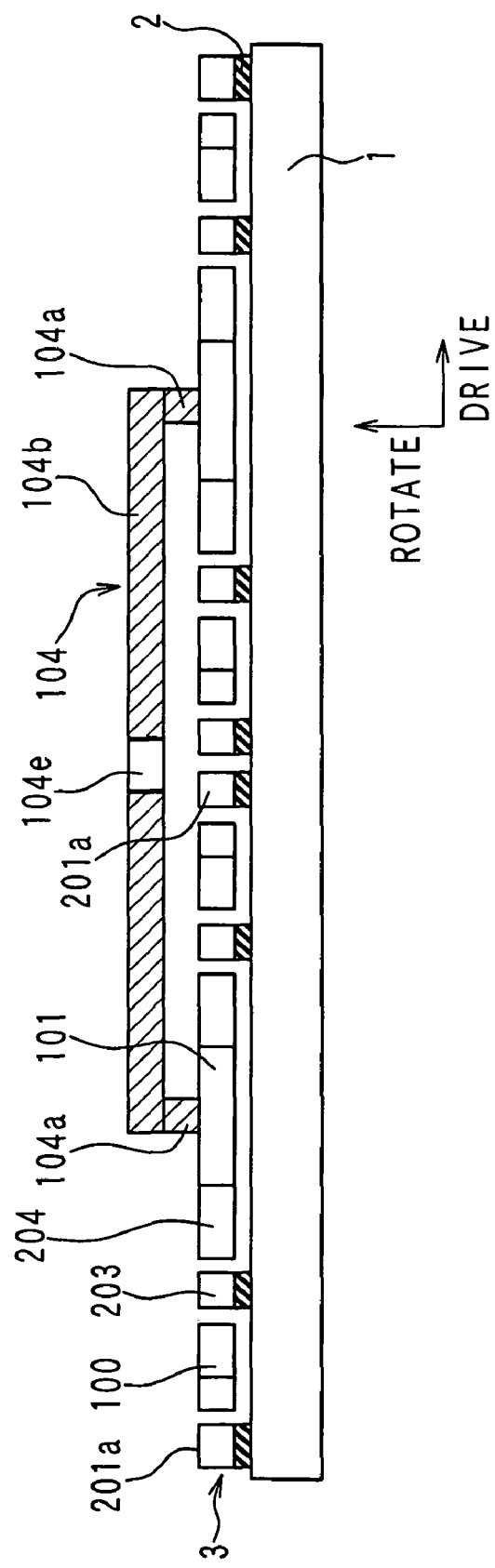
FIG. 6 is a diagram illustrating a cross-sectional view taken along the line VI-VI in FIG. 5.

FIG. 5 is a top view of the angular velocity sensor, and FIG. 6 is a cross-sectional view taken along the line VI-VI in FIG. 5. A difference between the first and second embodiments is as follows.

The angular velocity sensor includes two sensor units, i.e., first and second sensor units. Each sensor unit includes a drive weight 100 supported by a drive beam 101b. The drive beam 101b is fixed at one end to a substrate layer 1 by a drive beam fixing portion 207. Specifically, the drive weight 100 is supported by the drive beam 101b in such a manner that the drive weight 100 can be displaced in a drive direction shown in FIG. 5 but cannot be displaced in a detection direction shown in FIG. 5.

Each sensor unit further includes a tooth-shaped drive electrode 202 for producing drive power that causes the drive weight 100 to vibrate in the drive direction. The drive electrode 202 includes a movable drive electrode 202a extending from the drive weight 100 in the drive direction and a fixed drive electrode 202b extending from a drive electrode fixing portion 201a in the drive direction. The drive electrode fixing portion 201a is fixed to the substrate layer 1. The movable drive electrode 202a and the fixed drive electrode 202b are alternately arranged in the detection direction. Electrostatic attractive force is generated by applying a voltage between the movable drive electrode 202a and the fixed drive electrode 202b so that the drive weight 100 can be attracted toward the fixed drive electrode 202b side. The drive electrode 202 is provided on each side of the drive weight 100 in the drive direction, and the voltage is alternately applied to the drive electrode 202 on one side and the drive electrode 202 on the other side. In such an approach, the drive weight 100 can efficiently vibrate in the drive direction.

Each sensor unit further includes a detection weight 101 supported to the drive weight 100 by a detection beam 206. The detection beam 206 has elasticity in the detection direction so that the detection weight 101 can be displaced relative to the drive weight 100 in the detection direction. It is preferable that the detection weight 101 be configured not to be displaced relative to the drive weight 100 in the drive direction.

The detection weight 101 includes a movable detection electrode 204a that extends in the drive direction to detect displacement of the detection weight 101 in the detection direction. The movable detection electrode 204a is positioned to face a fixed detection electrode 204b in the detection direction. The fixed detection electrode 204b extends from a detection electrode fixing portion 203 in the drive direction. The detection electrode fixing portion 203 is fixed to the substrate layer 1. A separation distance between the movable detection electrode 204a and the fixed detection electrode 204b changes with displacement of the detection weight 101 in the detection direction. Accordingly, a capacitance between the movable detection electrode 204a and the fixed detection electrode 204b changes. The amount of displacement of the detection weight 101 in the detection direction can be measured by detecting the amount of change in the capacitance. The change in the capacitance can be obtained as a voltage value, for example, by using a standard capacitance-to-voltage conversion circuit. The movable detection electrode 204a and the fixed detection electrode 204b form a detection electrode 204.

As noted previously, the angular velocity sensor according to the second embodiment includes two sensor units, i.e., first and second sensor units. The first sensor unit includes a first oscillator 10a, and the second sensor unit includes a second oscillator 10b. Each of the oscillators 10a, 10b includes the drive weight 100 and the detection weight 101. The two oscillators 10a, 10b are mechanically coupled together by a coupling beam 104 so that the oscillators 10a, 10b can resonantly vibrate at the same frequency but in opposite phase. The coupling beam 104 is formed at a layer different from a layer where the drive weight 100 and the detection weight 101 are formed. The coupling beam 104 includes a pair of post portions 104a, a pair of beam portions 104b, and a center spring portion 104e. The post portions 104a are joined to the detection weights 101 of the two sensor units, respectively. The beam portions 104b are joined to the post portions 104a, respectively. The center spring portion 104e is connected between the beam portions 104b. In this way, according to the second embodiment, the coupling beam 104 couples together the detection weights 101, not the drive weights 100.

Therefore, the centers of gravities of the oscillators 10a, 10b are on the centers of the detection weights 101, not the drive weights 100. Since the detection weight 101 is not displaced relative to the drive weight 100 in the drive direction, the detection weight 101 vibrates in the drive direction together with the drive weight 100. Therefore, when the centers of gravities of the oscillators 10a, 10b (i.e., the centers of the detection weights 101) are coupled together by the coupling beam 104, the coupling beam 104 can work in the same manner as the first embodiment.

When an angular velocity is applied, the detection weights 101 are displaced in opposite directions in the detection direction. Therefore, it is required that the detection weights 101 are elastically coupled by the coupling beam 104 not only in the drive direction but also in the detection direction. For example, when the center spring portion 104e of the coupling beam 104 has a folded spring shape (like a H-shape) as shown in FIG. 5, the coupling beam 104 can have elasticity not only in the drive direction but also in the detection direction. That is, according to the second embodiment, the center spring portion 104e includes a first beam portion having elasticity in the drive direction and a second beam portion having elasticity in the detection portion. In such an approach, the elasticity in the drive direction and the elasticity in the detection direction can be designed independently. Therefore, for example, the elasticity in the detection direction can be reduced compared to the first embodiment.

As described above, according to the second embodiment, the detection weights 101 are mechanically coupled together by the coupling beam 104. Therefore, the oscillators 10a, 10b have the same resonance frequency for the following reasons.

As it is well known, when a force acts on an object having a certain natural frequency (i.e., resonant frequency), the amount of displacement of the object changes depending on a ratio between the force and the resonant frequency. In the angular velocity sensor, the Coriolis force can be considered as the force, and the detection weight 101 can be considered as the object. The Coriolis force appears synchronously with the vibration frequency of the detection weight 101. The amount of displacement of the detection weight 101 due to the Coriolis force can be detected as a capacitance change in the detection electrode 204. A difference between the capacitance changes in the detection electrodes 204 of the two sensor units is calculated to cancel the external acceleration components. If there is a difference between the amounts of displacements of the detection weights 101 due to the Coriolis force, the difference appears as an offset that affects the detection sensitivity of the angular velocity sensor. Therefore, it is preferable that the two detection weights 101 have the same resonance frequency. According to the second embodiment, since the detection weights 101 are coupled together by the coupling beam 104, the two oscillators 10a, 10b simultaneously resonate in the detection direction so that the amounts of displacements of the two detection weights 101 due to the Coriolis force can be equal to each other.

Third Embodiment

An angular velocity sensor according to a third embodiment of the present invention is described below with reference to FIGS. 7 and 8.

Figure 7:
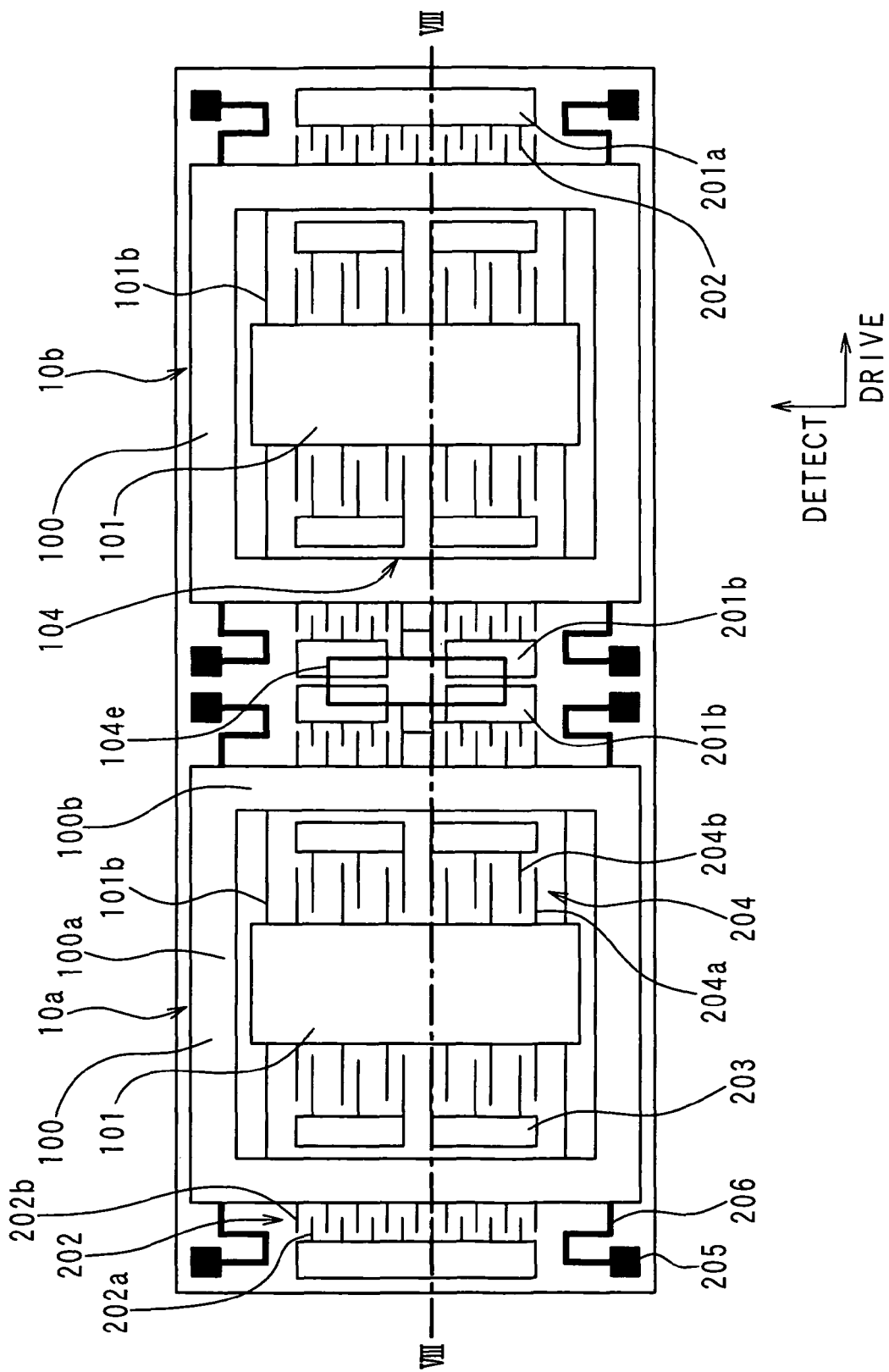
FIG. 7 is a diagram illustrating a top view of an angular velocity sensor according to a third embodiment of the present invention.
Figure 8:
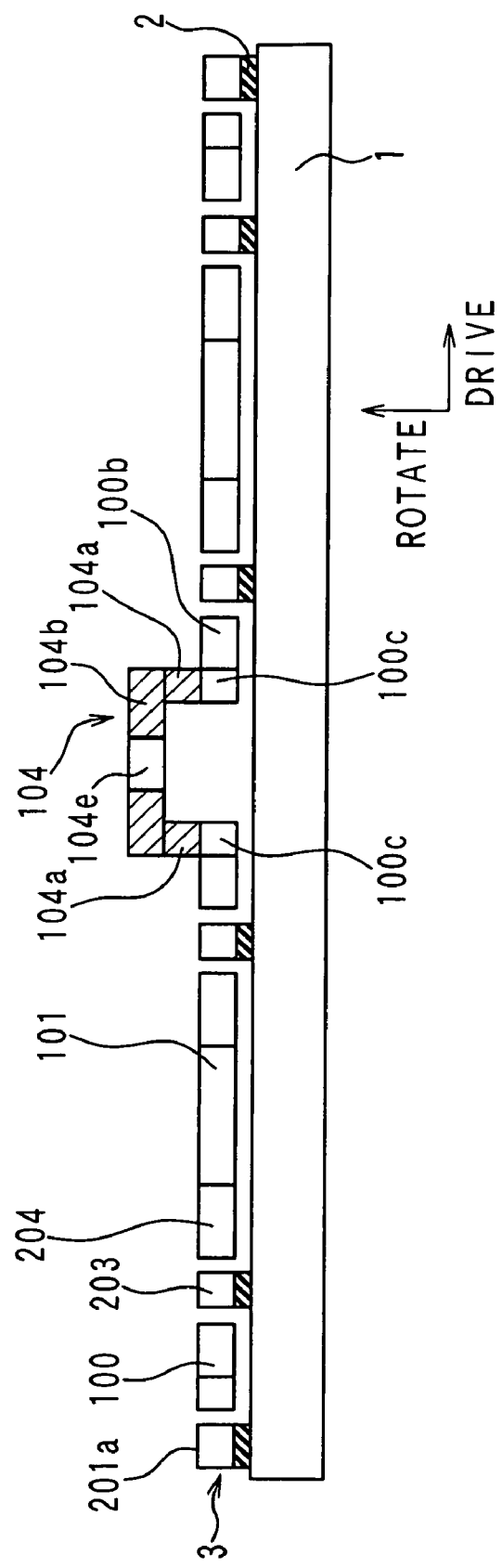
FIG. 8 is a diagram illustrating a cross-sectional view taken along the line VIII-VIII in FIG. 7.

FIG. 7 is a top view of the angular velocity sensor, and FIG. 8 is a cross-sectional view taken along the line VIII-VIII in FIG. 7.

In the first and second embodiments, the oscillators 10a, 10b are coupled together by the coupling beam 104 at the centers of gravities of the oscillators 10a, 10b in order to prevent the oscillators 10a, 10b from being inclined due to the weight of the coupling beam 104.

Alternatively, as shown in FIG. 7, the oscillators 10a, 10b can be coupled together by the coupling beam 104 in such a manner that the length of the coupling beam 104 can be minimized.

In the third embodiment, the coupling beam 104 couples together the drive weights 100. The drive weight 100 includes a first portion 100a, a second portion 100b, and a third portion 100c. The first portion 100a extends in the drive direction. The second portion 100b is joined to the first portion 100a and extends in the detection direction. As shown in FIG. 8, the third portion 100c is joined to an outer wall of the second portion 100b in such a manner that the third portion 100c of the drive weight 100 of the oscillator 10a can face the third portion 100c of the drive weight 100 of the oscillator 10b. The third portions 100c are coupled together by the coupling beam 104. Thus, the oscillators 10a, 10b are coupled together by the coupling beam 104 in such a manner that the length of the coupling beam 104 can be minimized.

As described above, according to the third embodiment, the length of the coupling beam 104 is minimized. Accordingly, the weight of the coupling beam 104 is reduced compared to the first and second embodiments.

Therefore, the inclination of the oscillators 10b, 10b due to the weight of the coupling beam 104 can be prevented without coupling together the oscillators 10a, 10b at the centers of gravities of the oscillators 10a, 10b.

Fourth Embodiment

An angular velocity sensor according to a fourth embodiment of the present invention is described below with reference to FIGS. 9 and 10.

Figure 9:
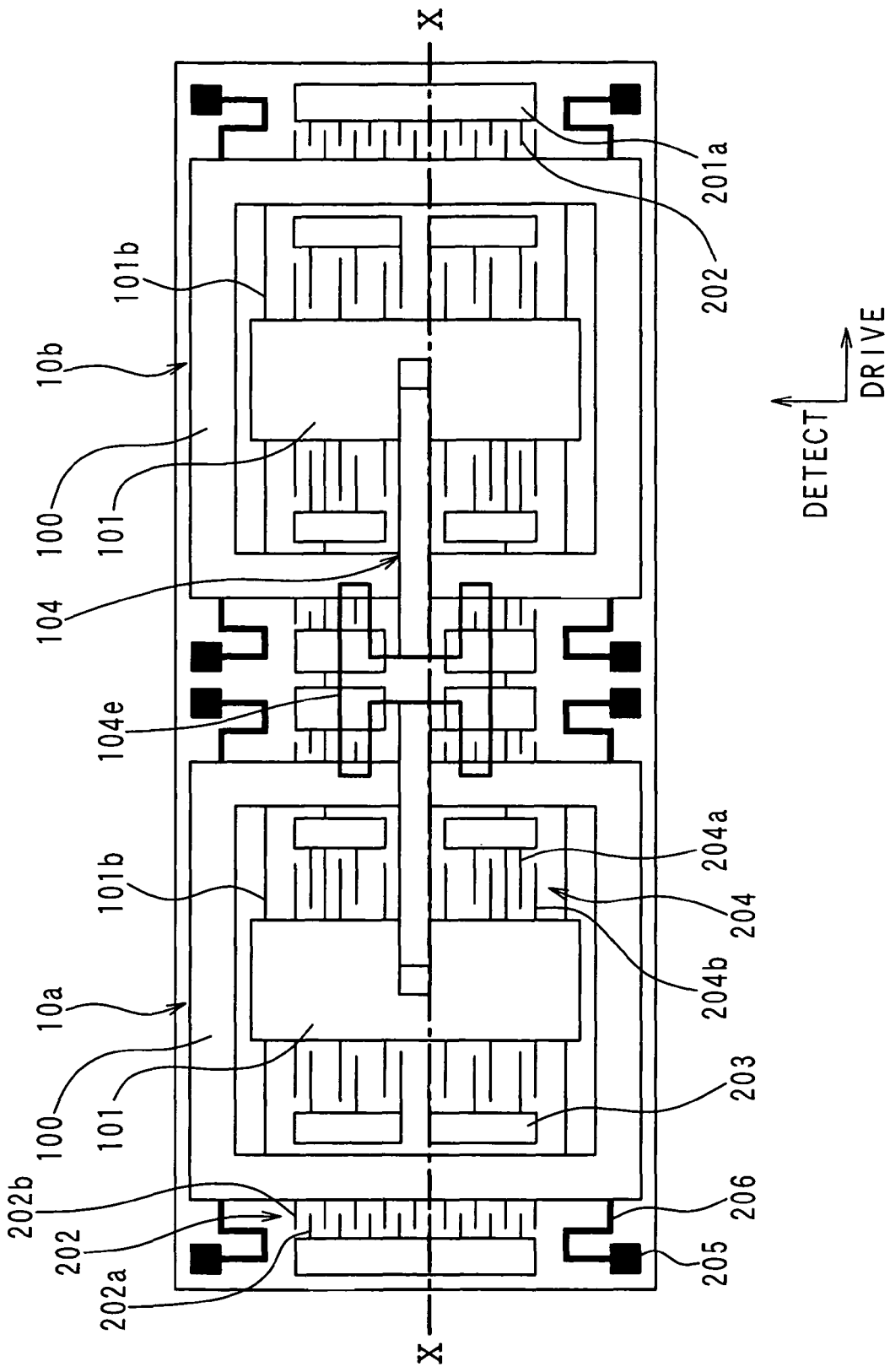
FIG. 9 is a diagram illustrating a top view of an angular velocity sensor according to a fourth embodiment of the present invention.
Figure 10:
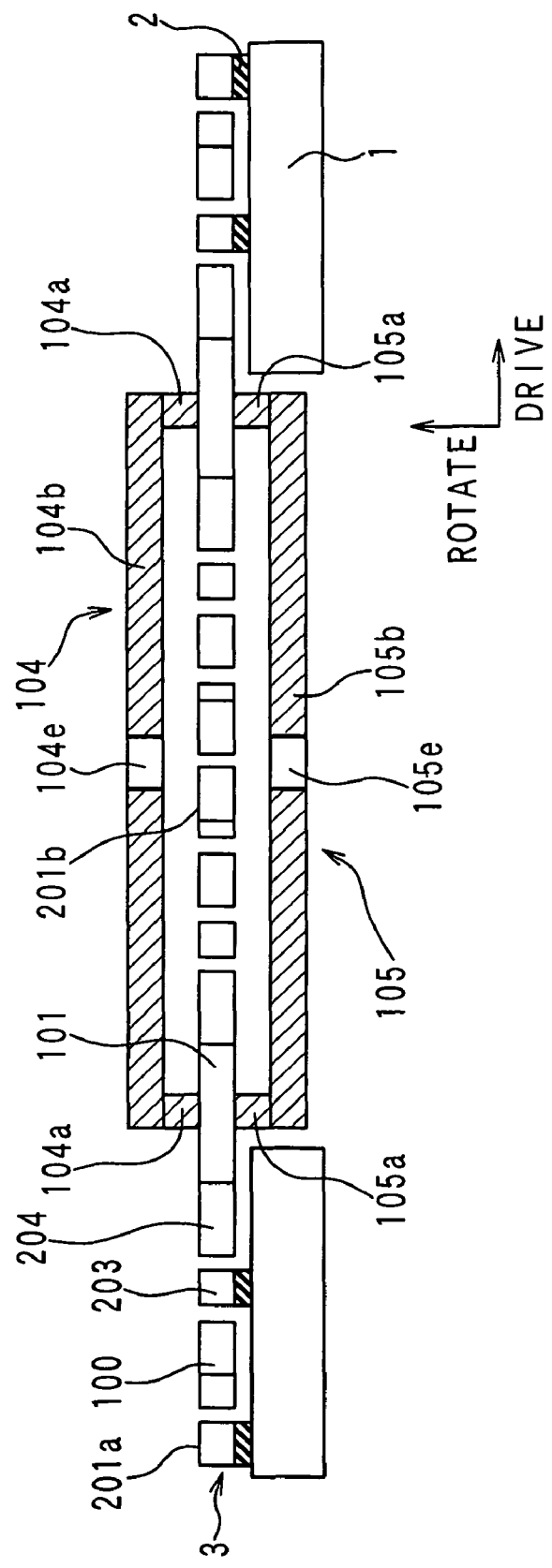
FIG. 10 is a diagram illustrating a cross-sectional view taken along the line X-X in FIG. 9.

FIG. 9 is a top view of the angular velocity sensor, and FIG. 10 is a cross-sectional view taken along the line X-X in FIG. 9.

The fourth embodiment is similar to the second embodiment. As can be seen from by comparing FIG. 6 and FIG. 10, a difference between the second and fourth embodiments is that a backside coupling beam 105 is provided on a backside of the oscillators 10a, 10b. The backside coupling beam 105 is identical in structure with the coupling beam 104 and located opposite to the coupling beam 104 across the oscillators 10a, 10b. As shown in FIG. 10, the substrate layer 1 is partially removed to form an accommodation space for the backside coupling beam 105.

For example, the accommodation space can be formed by placing a resist on a backside of the substrate layer 1 to cover a portion of the substrate layer 1, performing a wet etching to remove an uncovered portion of the substrate layer 1, and then performing a dry etching to remove an unnecessary oxide layer 2. After the accommodation space is formed, the backside coupling beam 105 is formed in the same manner as the coupling beam 104.

According to the second embodiment, the coupling beam 104 is provided on one side of the oscillators 10a, 10b. Therefore, if the coupling beam 104 is made of a material different from a material of which the oscillators 10a, 10b are made, the oscillators 10a, 10b may be pulled or pushed by the coupling beam 104 due to a difference in coefficient of thermal expansion between the coupling beam 104 and the oscillators 10a, 10b. In such a case, since the oscillators 10a, 10b are deformed, the drive weight cannot vibrate in a correct direction. As a result, a vibration loss occurs in the drive direction, and also an unwanted vibration occurs in the detection direction. That is, the detection vibration and the drive vibration cannot occur in the direction in which the substrate layer 1 extends. Therefore, noise is induced in the detection signal, and the detection accuracy is degraded.

In contrast, according to the fourth embodiment, the coupling beam 104 is provided on one side of the oscillators 10a, 10b, and the backside coupling beam 105 is provided on the backside of the oscillators 10a, 10b. The backside coupling beam 105 includes a pair of post portions 105a, a pair of beam portions 105b, and a center spring portion 105e. The backside coupling beam 105 is identical in structure to the coupling beam 104 and located opposite to the coupling beam 104 across the oscillators 10a, 10b. In such an approach, even if the coupling beam 104 and the backside coupling beam 105 are made of a material different from a material of which the oscillators 10a, 10b are made, stress applied from the backside coupling beam 105 to the oscillators 10a, 10b due to the difference in coefficient of thermal expansion cancels stress applied from the coupling beam 104 to the oscillators 10a, 10b due to the difference in coefficient of thermal expansion. Thus, the oscillators 10a, 10b can be prevented from being deformed.

It is preferable that the backside coupling beam 105 be identical in shape and weight to the coupling beam 104. Further, it is preferable that the post portion 105a of the backside coupling beam 105 is located directly opposite to the post portion 104a of the coupling beam 104. In such an approach, the stress applied from the coupling beam 104 to the oscillators 10a, 10b can exactly cancel the stress applied from the backside coupling beam 105 to the oscillators 10a, 10b.

Fifth Embodiment

A fifth embodiment of the present invention is described below with reference to FIG. 11.

Figure 11:
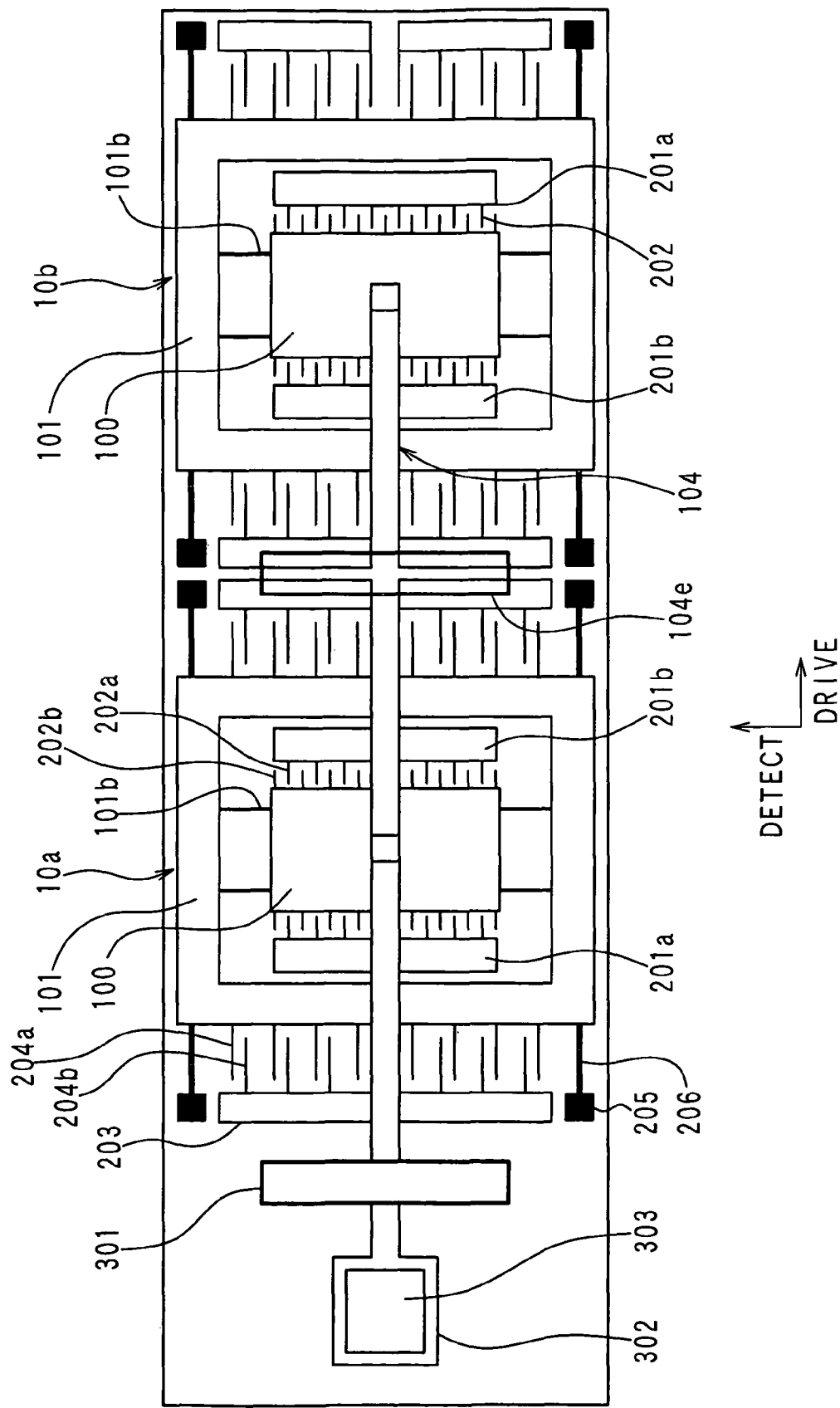
FIG. 11 is a diagram illustrating a top view of an angular velocity sensor according to a fifth embodiment of the present invention.

As can be seen by comparing FIG. 1 and FIG. 11, the fifth embodiment is similar to the first embodiment. A difference between the first and fifth embodiments is described below.

According to the fifth embodiment, at least one end of the coupling beam 104 is elongated beyond the post portion 104a and joined to a first end of a spring portion 301. The spring portion 301 has elasticity both in the drive direction and in the detection direction. A second end of the spring portion 301 is joined to a coupling beam fixing portion 302 that is fixed to the substrate layer 1. The coupling beam fixing portion 302 is provided with a bonding pad 303 for electrical connection by wire bonding.

As mentioned in the first embodiment, the drive weight 100 vibrates by electrostatic force generated in the drive electrode 202. To generate the electrostatic force, there is a need to apply a voltage between the movable drive electrode 202a and the fixed drive electrode 202b. For example, the voltage may be applied through a bonding wire connected to an aluminum bonding pad that is formed to the detection beam fixing portion 205. In this case, an electric current flows from the detection beam fixing portion 205 to the drive beam 101b through the detection weight 101 and the drive beam 101b. Thus, the electric current forms an electrical potential distribution from a root of the drive beam 101b to the drive weight 100. Ideally, it is preferable that an electrical potential distribution in the movable drive electrode 202a be uniform. Since the drive weight 100 is made of an electrical conductor, the drive weight 100 has a sheet resistance: Therefore, it is preferable that the voltage be applied in a symmetrical manner. To do so, there is a need to form the aluminum bonding pad to each detection beam fixing portion 205. Accordingly, the number of the aluminum bonding pads and bonding wires are increased. As a result, the angular velocity sensor is increased in size.

In contrast, according to the fifth embodiment, the voltage can be applied from the center of gravity of the drive weight 100. Therefore, the electrical potential distribution in the movable drive electrode 202a can be uniform. Further, since the voltage can be applied by using only one bonding pad 303, the angular velocity sensor can be reduced in size.

Furthermore, according to the fifth embodiment, the coupling beam 104 is elongated in the drive direction, and the oscillators 10a, 10b are arranged in a line and fixed to the substrate layer 1 through the spring portion 301. In such an approach, the drive weight 100 can accurately easily vibrate in the drive direction so that the detection accuracy can be improved.

Sixth Embodiment

A sixth embodiment of the present invention is described below with reference to FIGS. 12, 13, and 14.

A difference between the sixth embodiment and the preceding embodiments is described below.

Figure 12:
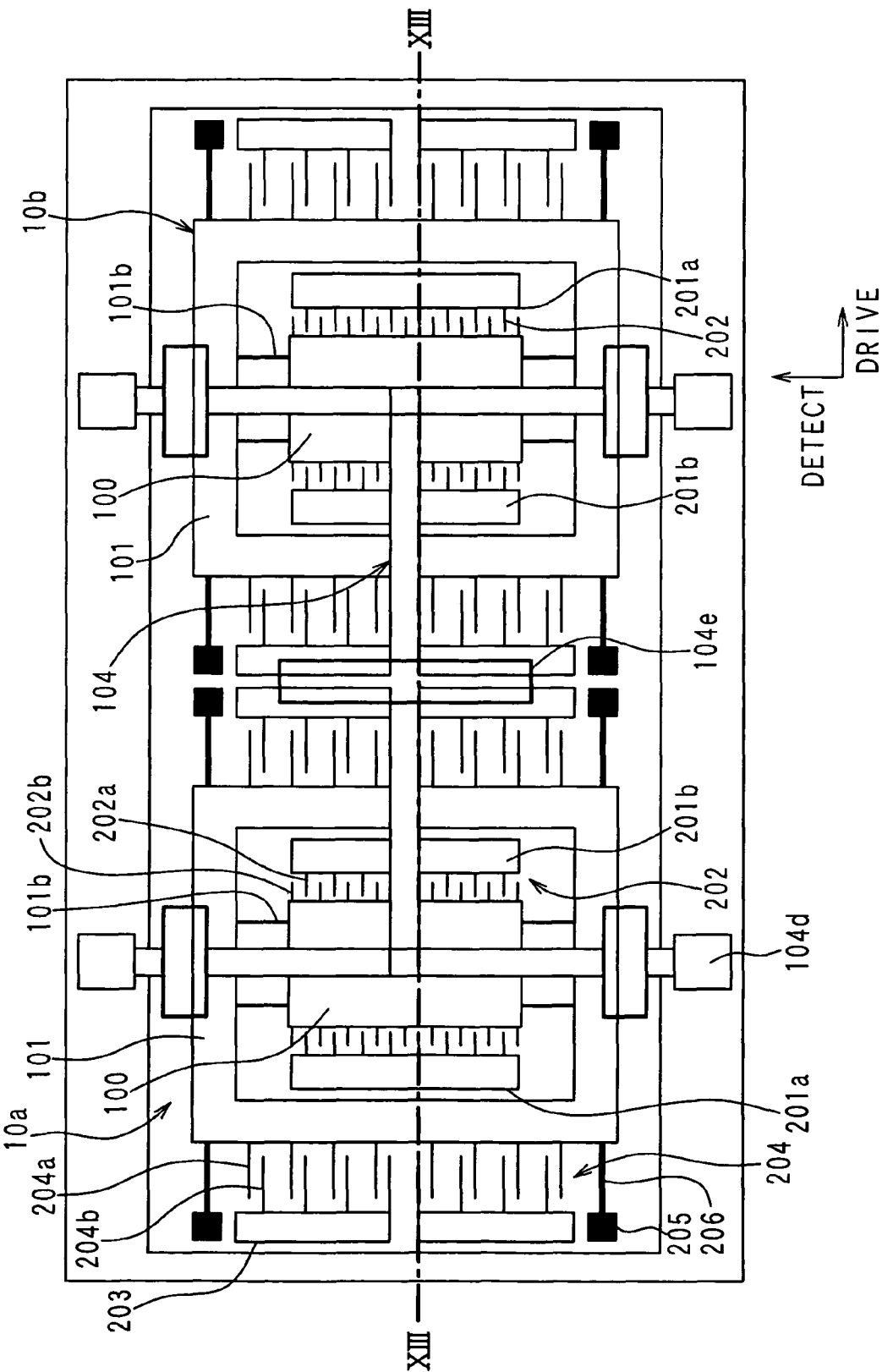
FIG. 12 is a diagram illustrating a top view of an angular velocity sensor according to a sixth embodiment of the present invention.
Figure 13:
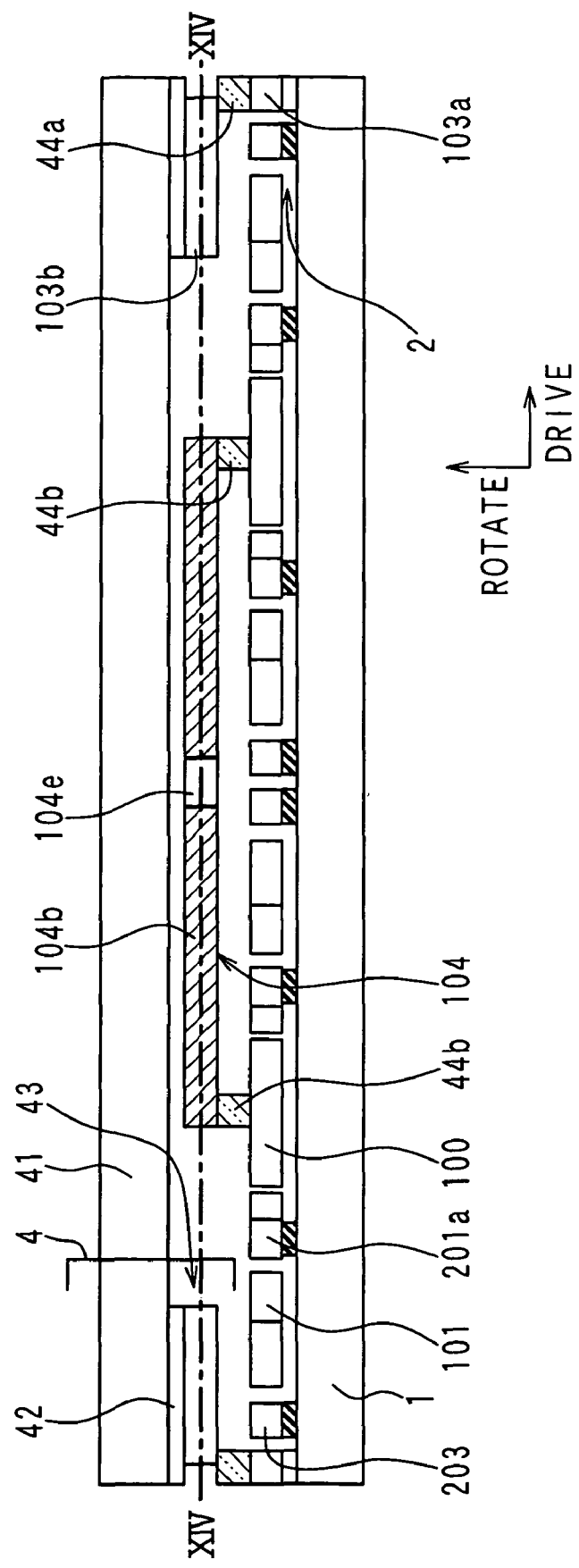
FIG. 13 is a diagram illustrating a cross-sectional view taken along the line XIII-XIII in FIG. 12.
Figure 14:
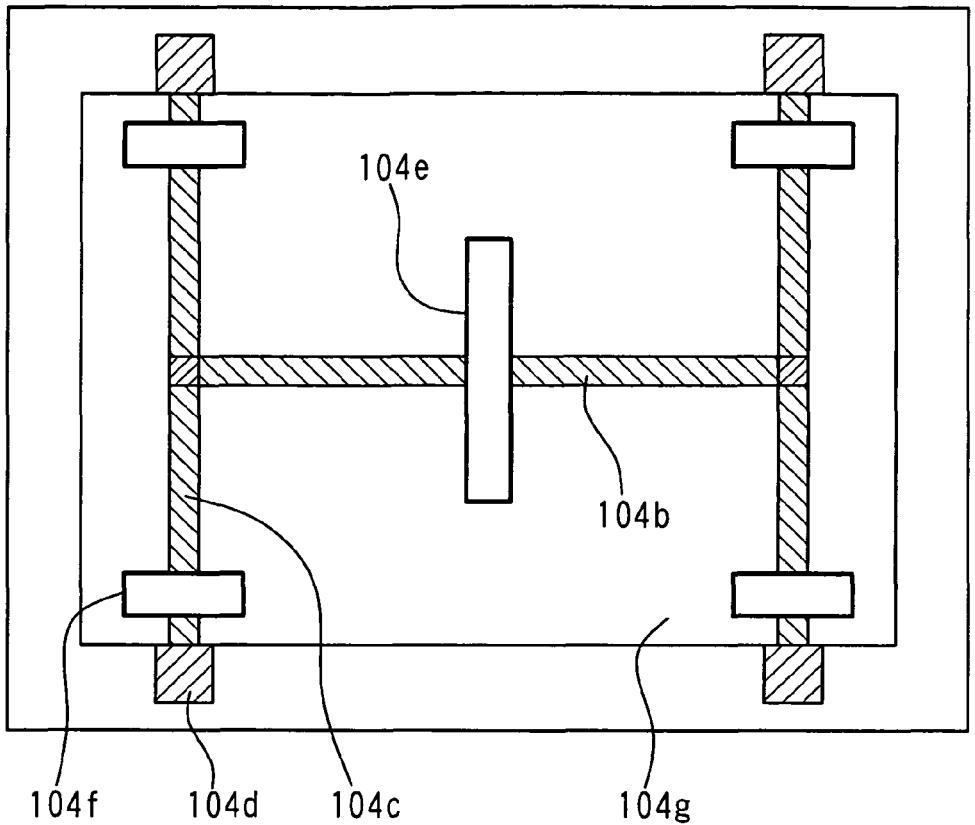
FIG. 14 is a diagram illustrating a cross-sectional view taken along the line XIV-XIV in FIG. 13.

FIG. 12 is a top view of the angular velocity sensor, and FIG. 13 is a cross-sectional view taken along the line XIII-XIII in FIG. 12. As shown in FIG. 12, according to the sixth embodiment, the angular velocity sensor employs a wafer level package (WLP) in which the SOI substrate 5 is joined to a cap substrate 4 that is located to face the SOI substrate 5. The two sensor units and the coupling beam 104 are sealed in a space between the cap substrate 4 and the substrate layer 1 of the SOI substrate 5. The sealed space is held under vacuum or a reduced pressure. It is noted that structures of the sensor units and the coupling beam 104 of the sixth embodiment are not limited to the structure shown in FIG. 12.

The cap substrate 4 is described in detail below. As shown in FIGS. 13 and 14, the cap substrate 4 is formed by processing a SOI substrate. The cap substrate 4 includes a post portion 104a, a beam portion 104b, a supporting beam portion 104c, a cap substrate-side post portion 104d, a center spring, portion 104e, and a supporting spring portion 104f. That is, according to the sixth embodiment, the cap substrate 4 includes the coupling beam 104. The cap substrate-side post portion 104d is formed by a silicon oxide layer 42 and an element forming layer 43 of the cap substrate 4. The cap substrate-side post portion 104d and the beam portion 104b are connected through the supporting spring portion 104f by the supporting beam portion 104c. The beam portion 104b is formed by the element forming layer 43 of the cap substrate 4. The post portion 104a is formed between the beam portion 104b and the SOI substrate 5 (i.e., the drive weight 100).

As shown in FIG. 13, the oxide layer 42 located between the substrate layer 41 and each of the center spring portion 104e, the beam portion 104b, and the supporting beam portion 104c is removed. Therefore, the coupling beam 104 can have elasticity both in the drive direction and in the detection direction along a direction in which the cap substrate 4 extends.

A manner in which the coupling beam 104 is supported to the cap substrate 4 is described below. FIG. 14 is a cross-sectional view taken along the line XIV-XIV in FIG. 13. As shown in FIG. 14, the cap substrate-side post portion 104d is fixed to the substrate layer 41. That is, the oxide layer 42 is not removed at a position corresponding to the cap substrate-side post portion 104d. In contrast, there is a space between the substrate layer 41 of the cap substrate 4 and each of the supporting spring portion 104f, the beam portion 104b; and the supporting beam portion 104c. That is, the oxide layer 42 is removed at positions corresponding to the supporting spring portion 104f, the beam portion 104b, and the supporting beam portion 104c so that the space can be formed. Further, an insulating space 104g is formed at the element forming layer 43 to surround the coupling beam 104. In this way, the supporting spring portion 104f, the supporting beam portion 104c, and the beam portion 104b are supported to the cap substrate 4 and can be displaced in the direction in which the cap substrate 4 extends.

By the way, when the Coriolis force is applied, the two drive weights 100 are displaced in opposite directions in the detection direction. For example, one post portion 104a is displaced in a minus direction of the detection direction, and the other post portion 104a is displaced in a plus direction of the detection direction. Like the center spring portion 104e, the supporting spring portion 104f has elasticity. Therefore, vibrations of the drive weight 100 and the detection weight 101 are transmitted through the post portion 104a to the supporting spring portion 104f and the center spring portion 104e. As a result, the supporting spring portion 104f and the center spring portion 104e are deformed in the drive direction and in the detection direction. In FIG. 14, the supporting beam portion 104c is shaped so that the supporting beam portion 104c can have elasticity in one direction. Alternatively, like the beam portion 104b, the supporting beam portion 104c can be shaped so that the supporting beam portion 104c can have elasticity in two directions. For example, the supporting beam portion 104c can have a folded spring shape.

Next, a manner in which the cap substrate 4 and the SOI substrate 5 are joined together is described below. An adhesive layer 44a of low-melting-point glass is formed on a perimeter portion 103b of the element forming layer 43. Likewise, an adhesive layer 44b of low-melting-point glass is formed on a surface of the cap substrate-side post portion 104d. The adhesive layer 44b serves as the post portion 104a, which is joined to a coupling target (i.e., the drive weight 100 or the detection weight 101). For example, like the first embodiment, the post portion 104a can be joined to the coupling target at a position corresponding to the center of gravity of the coupling target. Alternatively, like the second embodiment, the post portion 104a can be joined to the coupling target in such a manner that the length of the coupling beam 104 can be minimized. It is preferable that the beam portion 104b have a larger width at a position where the post portion 104a is joined. In such an approach, the post portion 104a can be accurately positioned and joined to the beam portion 104b.

As described above, according to the sixth embodiment, the coupling beam 104 is formed in the cap substrate 4. The oscillators 10a, 10b and the coupling beam 104 are located in the space sealed between the cap substrate 4 and the SOI substrate 5. In such an approach, it is less likely that dusts particles generated in manufacturing processes (e.g., dicing process) will enter the oscillators 10a, 10b. As a result, a manufacturing defect can be reduced. Preferably, the dicing process can be performed, after the cap substrate 4 and the SOI substrate 5 are joined together so that the oscillators 10a, 10b can be coupled together by the coupling beam 104 and sealed in the space between the cap substrate 4 and the SOI substrate 5. In such an approach, the dusts particles generated in the dicing process can be surely prevented from entering the oscillators 10a, 10b.

Further, according to the sixth embodiment, elastic of the coupling beam 104 can be adjusted by adjusting at least one of the center spring portion 104e and the supporting spring portion 104f. Therefore, the elastic of the coupling beam 104 can be designed flexibly.

The adhesive layer 44b can be made of a material other than a low-melting-point glass, as long as the adhesive layer 44b can act as not only a spacer between the coupling beam 104 and the oscillators 10a, 10b, but also an adhesive for joining the coupling beam 104 to the oscillators 10a, 10b.

For example, when the adhesive layer 44b is made of an electrically insulating material such as silicon oxide, the coupling beam 104 and the coupling target (i.e., the drive weight 100 or the detection weight 101) can be electrically insulated from each other. For another example, when the adhesive layer 44b is made of an electrically conductive material such as aluminum, the coupling beam 104 and the coupling target can be electrically connected to each other. In such a case, an electrode connected to the cap substrate-side post portion 104d can be formed to the substrate layer 41 of the cap substrate 4. In such an approach, a drive signal can be applied or a detection signal can be drawn from the cap substrate 4 by using the electrode. It is noted that each of silicon oxide and aluminum can be directly joined to silicon.

Seventh Embodiment

An angular velocity sensor according to a seventh embodiment of the present invention is described below with reference to FIG. 15.

Figure 15:
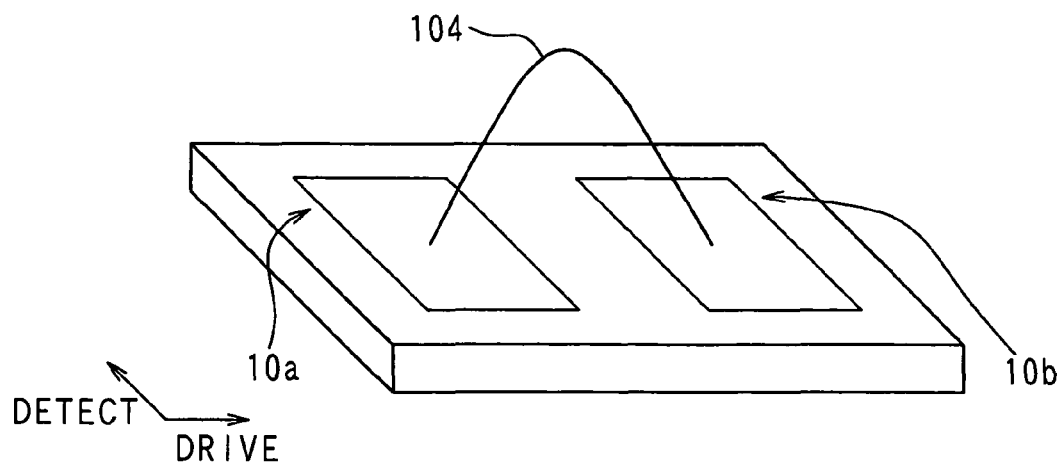
FIG. 15 is a diagram illustrating a perspective view of a coupling beam of an angular velocity sensor according to a seventh embodiment of the present invention.

As shown in FIG. 15, according to the seventh embodiment, the coupling beam 104 has an arch shape. That is, the coupling beam 104 is curved in the thickness direction of the oscillators 10a, 10b. The oscillators 10a, 10b are mechanically, elastically coupled together by the arch-shaped coupling beam 104 so that the oscillators 10a, 10b can vibrate at the same frequency but in opposite phase in the drive direction and the detection direction.

It is preferable that the oscillators 10a, 10b be coupled together by the arch-shaped coupling beam 104 at the centers of gravities of the oscillators 10a, 10b in order to prevent the oscillators 10a, 10b from being inclined due to the weight of the arch-shaped coupling beam 104.

For example, the arch-shaped coupling beam 104 can be formed by MEMS technology. Alternatively, the arch-shaped coupling beam 104 can be formed by coupling the oscillators 10a, 10b by a bonding wire. In such an approach, the arch-shaped coupling beam 104 can be easily formed.

Eighth Embodiment

An angular velocity sensor according to an eighth embodiment of the present invention is described below with reference to FIG. 16.

Figure 16:
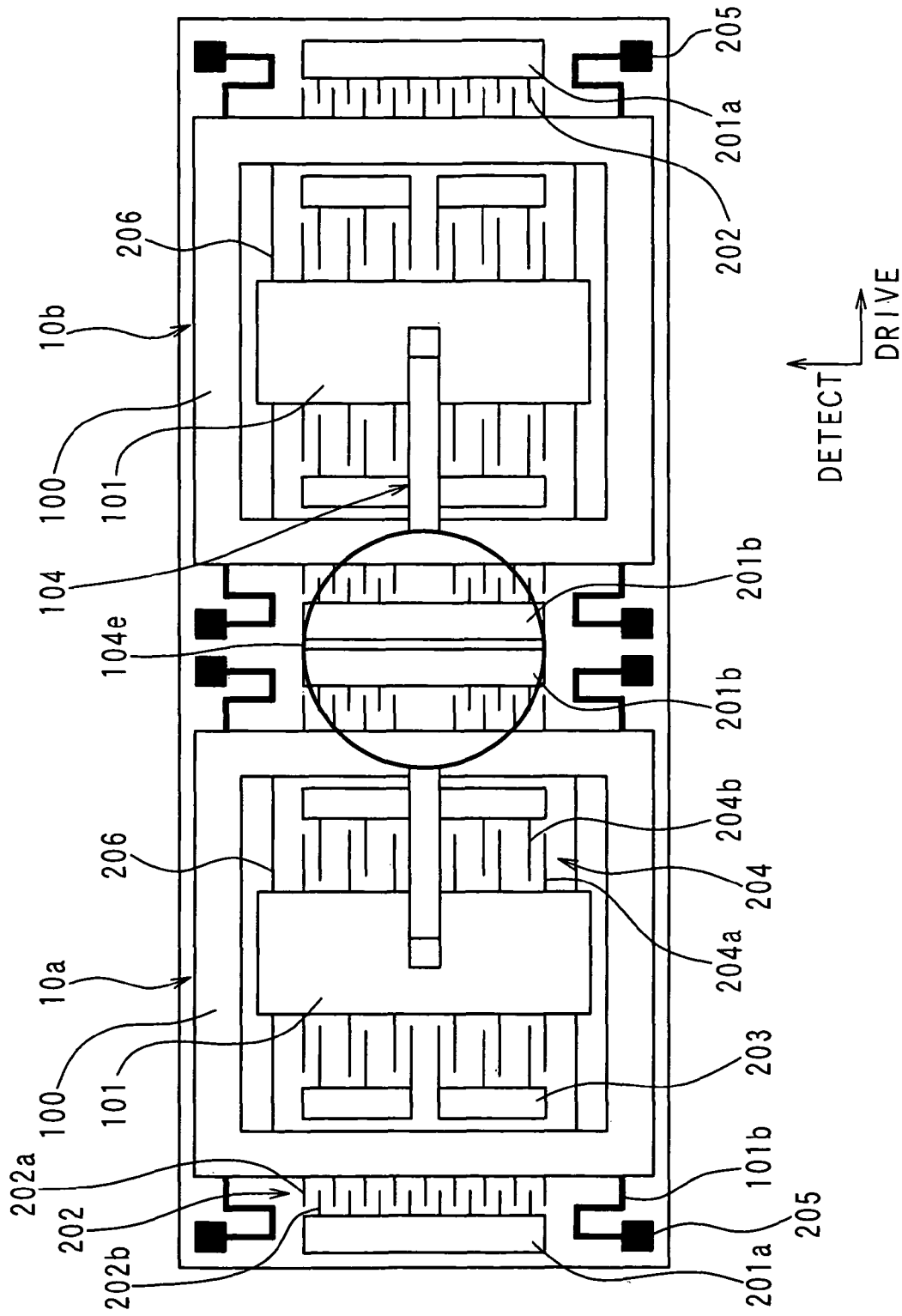
FIG. 16 is a diagram illustrating a top view of an angular velocity sensor according to an eighth embodiment of the present invention.

As shown in FIG. 16, according to the eighth embodiment, the center spring portion 104e of the coupling beam 104 has a circular shape on a plane parallel to the direction in which the substrate layer 1 extends. The oscillators 10a, 10b are mechanically, elastically coupled together by the coupling beam 104 having the circular center spring portion 104e so that the oscillators 10a, 10b can vibrate at the same frequency but in opposite phase in the drive direction and the detection direction.

In FIG. 16, the center spring portion 104e of the coupling beam 104 has a perfectly circular shape. Alternatively, the center spring portion 104e can have an elliptical shape with a major axis extending in the detection direction or the drive direction. In such an approach, elasticity of the coupling beam 104 in the drive direction and elasticity of the coupling beam 104 in the detection direction can be designed independently. For example, when the major axis of the elliptical center spring portion 104e extends in the detection direction, the elasticity of the coupling beam 104 becomes smaller in the drive direction than in the detection direction. In this way, vibration frequencies of the oscillators 10a, 10b can be adjusted flexibly by not only adjusting elasticities of the drive beam 101b and detection beam 206 but also adjusting the elasticity of the coupling beam 104.

Ninth Embodiment

An angular velocity sensor according to an ninth embodiment of the present invention is described below with reference to FIG. 17.

Figure 17:
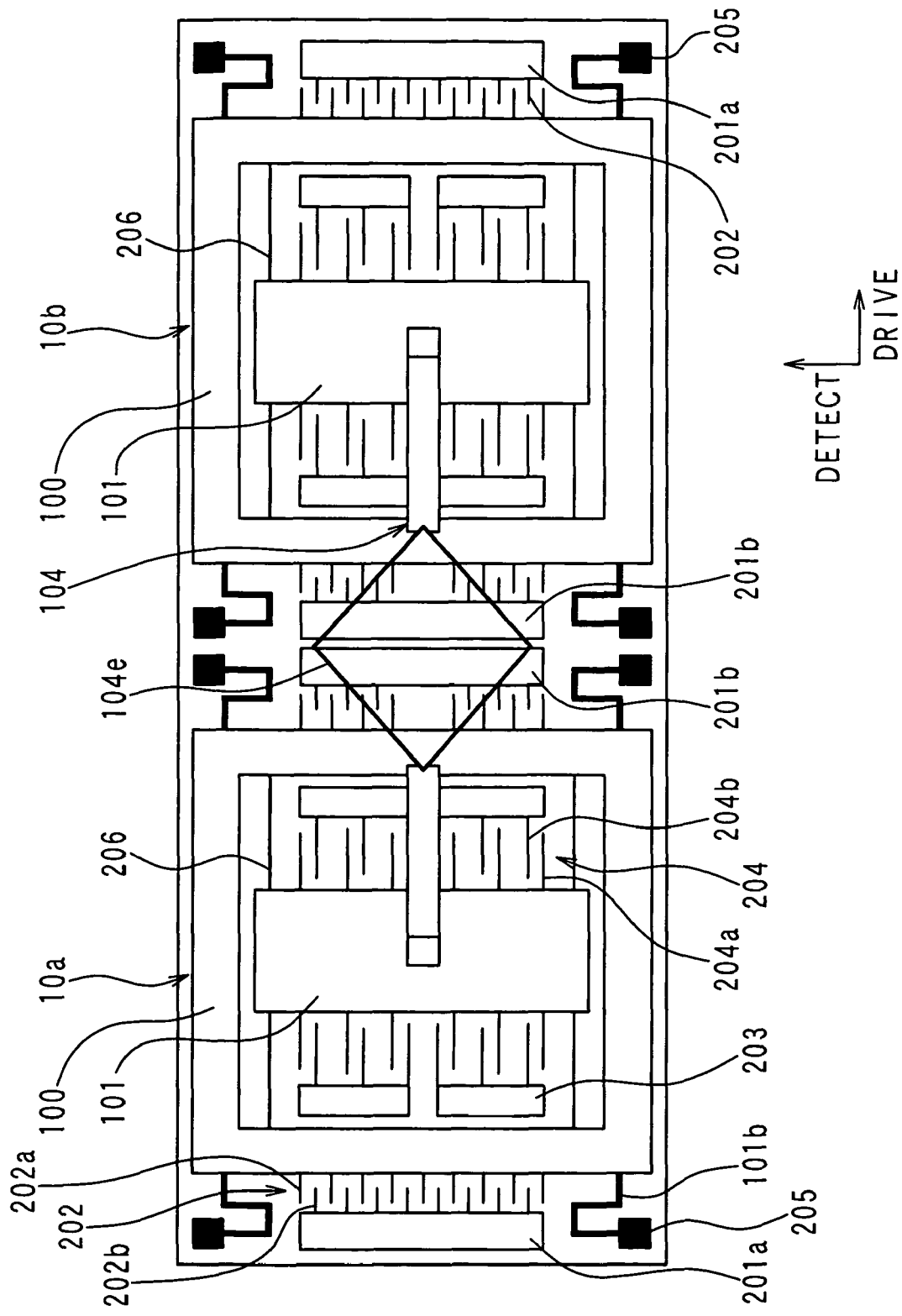
FIG. 17 is a diagram illustrating a top view of an angular velocity sensor according to a ninth embodiment of the present invention.

As shown in FIG. 17, according to the ninth embodiment, the center spring portion 104e of the coupling beam 104 has a rhombic (i.e., diamond) shape on the plane parallel to the direction in which the substrate layer 1 extends. The oscillators 10a, 10b are mechanically, elastically coupled together by the coupling beam 104 having the rhombic center spring portion 104e so that the oscillators 10a, 10b can vibrate at the same frequency but in opposite phase in the rive direction and the detection direction.

In FIG. 17, a side of the rhombic center spring portion 104e forms an angle of about 45° with respect to the drive direction. The angle formed by the side of the rhombic center spring portion 104e with respect to the drive direction can be an angle other than 45°, as long as the angle is acute, i.e., in a range of 0° to 90°. In such an approach, elasticity of the coupling beam 104 in the drive direction and elasticity of the coupling beam 104 in the detection direction can be designed independently. For example, when the side of the rhombic center spring portion 104e forms an angle of 45° or more with respect to the drive direction, the elasticity of the coupling beam 104 becomes smaller in the drive direction than in the detection direction.

In this way, vibration frequencies of the oscillators 10a, 10b can be adjusted flexibly by not only adjusting elasticities of the drive beam 101b and detection beam 206 but also adjusting the elasticity of the coupling beam 104.

Tenth Embodiment

Figure 18:
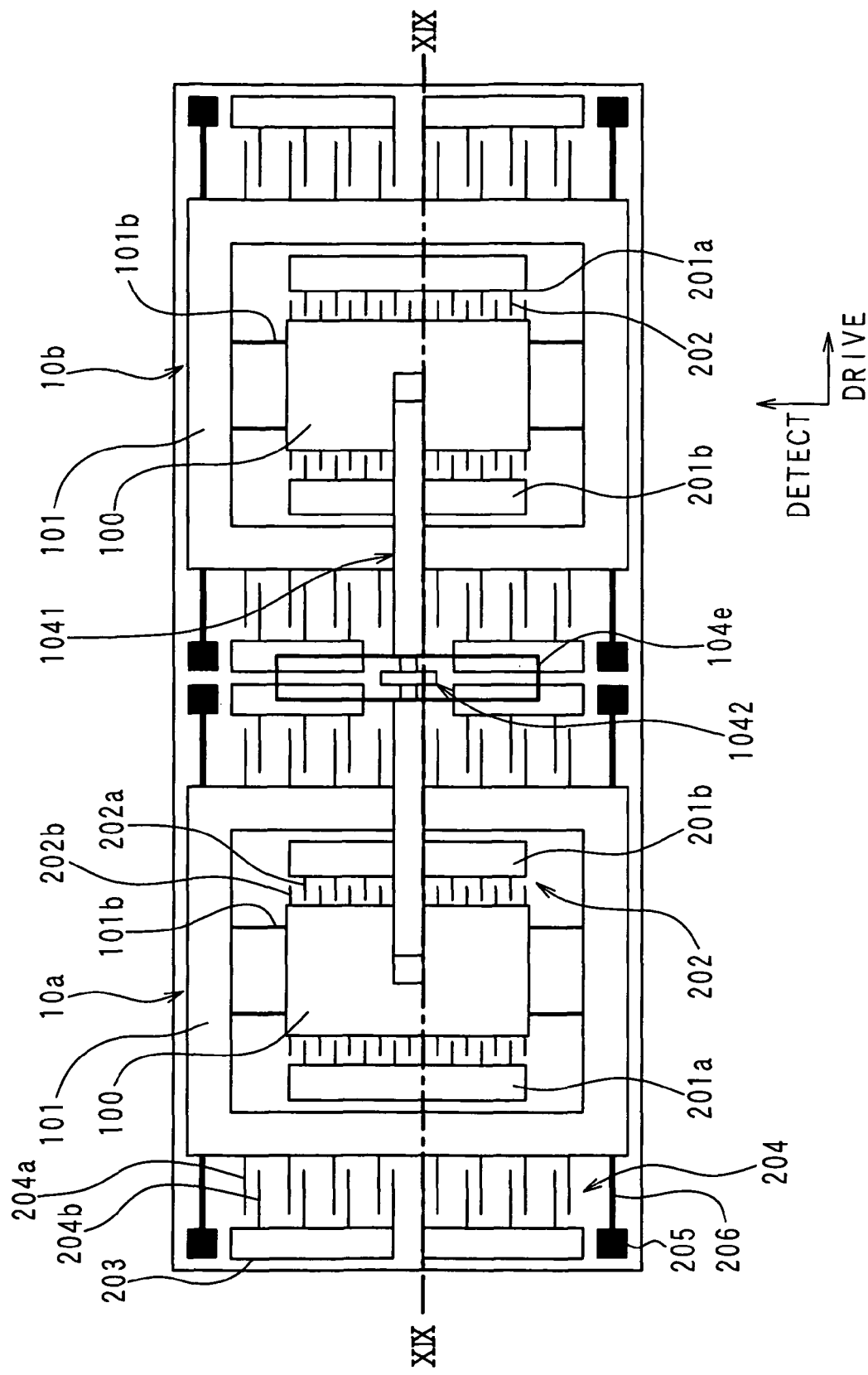
FIG. 18 is a diagram illustrating a top view of an angular velocity sensor according to a tenth embodiment of the present invention.
Figure 19:
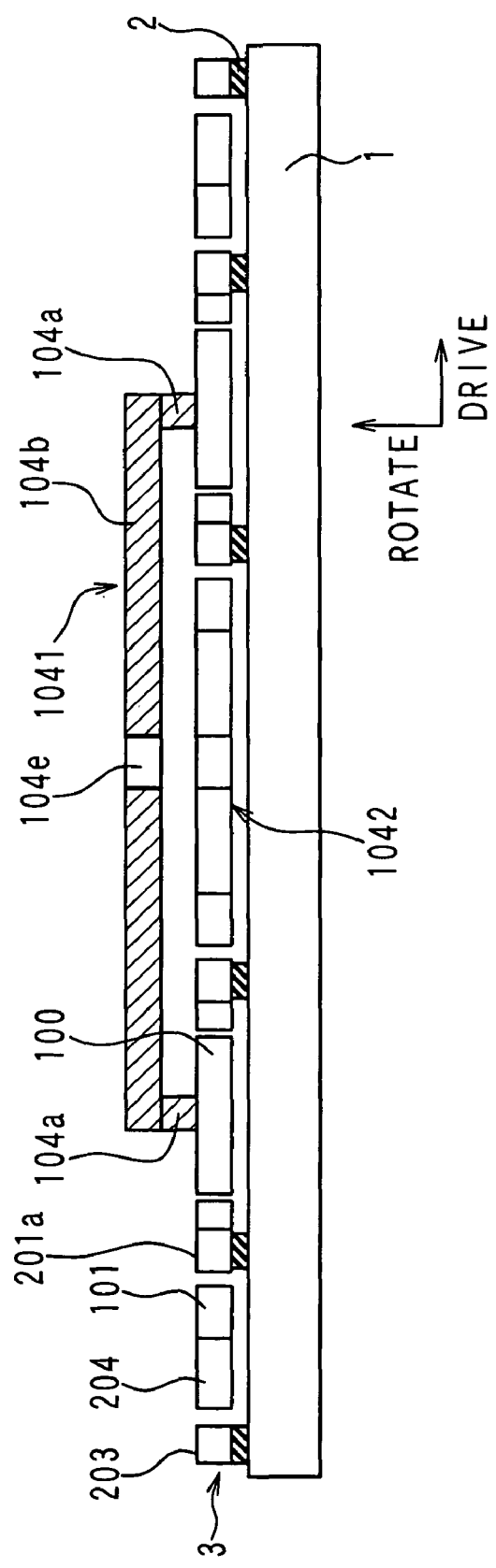
FIG. 19 is a diagram illustrating a cross-sectional view taken along the line XIX-XIX in FIG. 18.

An angular velocity sensor according to a tenth embodiment of the present invention is described below with reference FIGS. 18 and 19. FIG. 18 is a top view of the angular velocity sensor, and FIG. 19 is a cross-sectional view taken along the line XVIII-XVIII in FIG. 18. A difference between the tenth embodiment and the preceding embodiments is as follows.

According to the tenth embodiment, the angular velocity sensor includes two coupling beams, i.e., a drive coupling beam 1041 and a detection coupling beam 1042. The drive coupling beam 1041 is identical in structure to the coupling beam 104 of the first embodiment and couples together the drive weights 100 of the oscillators 10a, 10b.

The detection coupling beam 1042 couples together the detection weights 101 of the oscillators 10a, 10b. The detection coupling beam 1042 has elasticity both in the drive direction and in the detection direction. Therefore, when the Coriolis force is applied, the detection weights 101 of the oscillators 10a, 10b are displaced in opposite directions. That is, the detection coupling beam 1042 acts in the same manner as the coupling beam 104 of the second embodiment.

The detection coupling beam 1042 is formed by etching the element forming layer 3. That is, the detection coupling beam 1042 is formed together with the oscillators 10a, 10b through the processes shown in FIGS. 3A-3F.

In this way, the drive coupling beam 1041 and the detection coupling beam 1042 are formed at different layers, and the detection coupling beam 1042 and the oscillators 10a, 10b are formed at the same layer.

As described above, according to the tenth embodiment, the angular velocity sensor has two coupling beams 1041, 1042. The coupling beam 1041 serves in the same manner as the coupling beam 104 of the first embodiment, and the coupling beam 1042 serves in the same manner as the coupling beam 104 of the second embodiment. Therefore, the tenth embodiment can have the advantages of the first and second embodiments. Further, since the coupling beams 1041, 1042 are formed in the same manufacturing process, the coupling beams 1041, 1042 can have the same characteristics. Therefore, the detection sensitivity of the angular velocity sensor can be improved.

The tenth embodiment can be combined with the sixth embodiment the drive coupling beam 1041 can be formed in the cap substrate 4.

Like the second embodiment, the detection coupling beam 1042 and the oscillators 10a, 10b can be formed at the different layers. In such a case, the drive coupling beam 1041 and the oscillators 10a, 10b can be formed at the same layer.

Eleventh Embodiment

Figure 20:
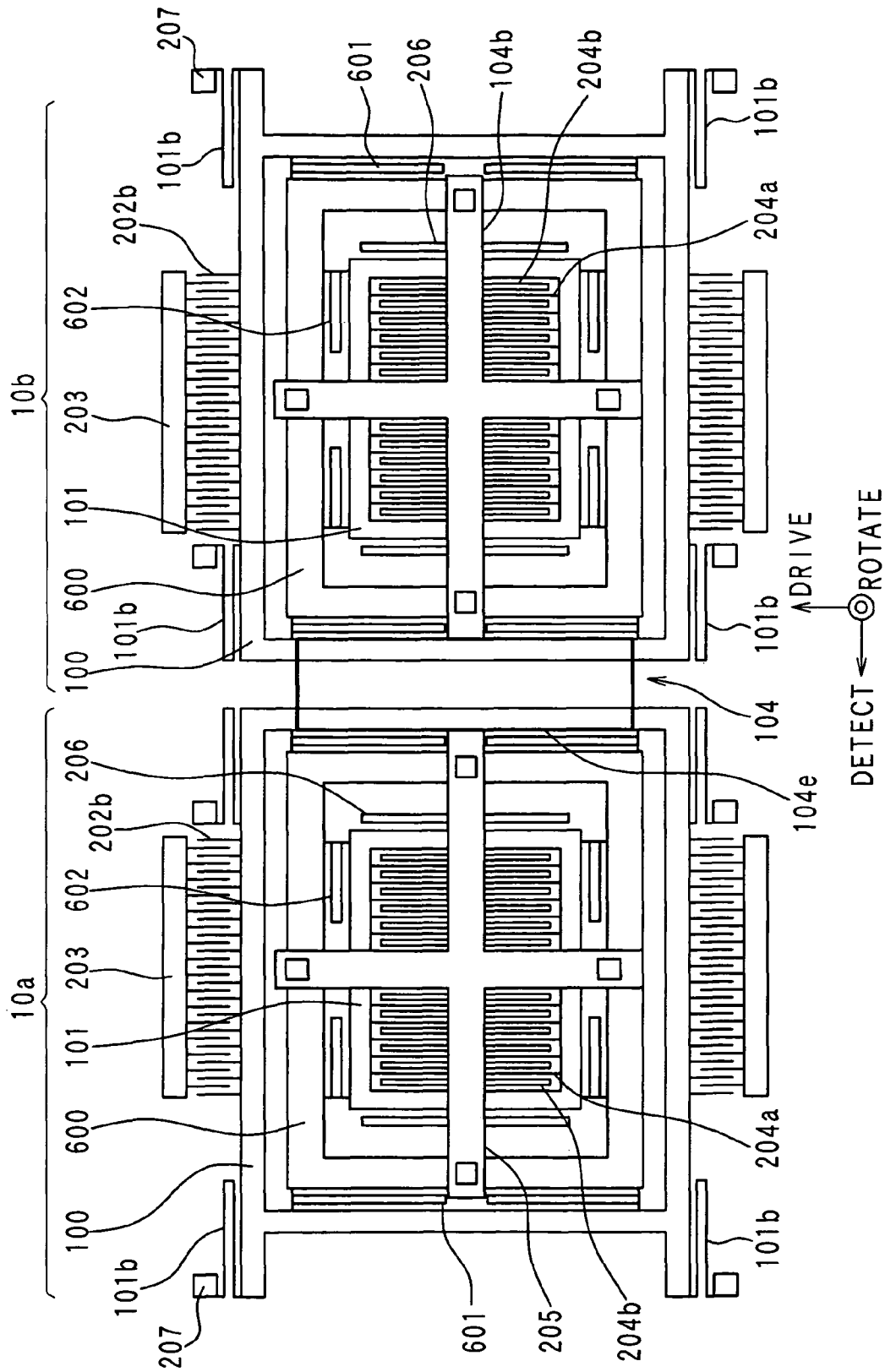
FIG. 20 is a diagram illustrating a top view of an angular velocity sensor according to an eleventh embodiment of the present invention.
Figure 21:
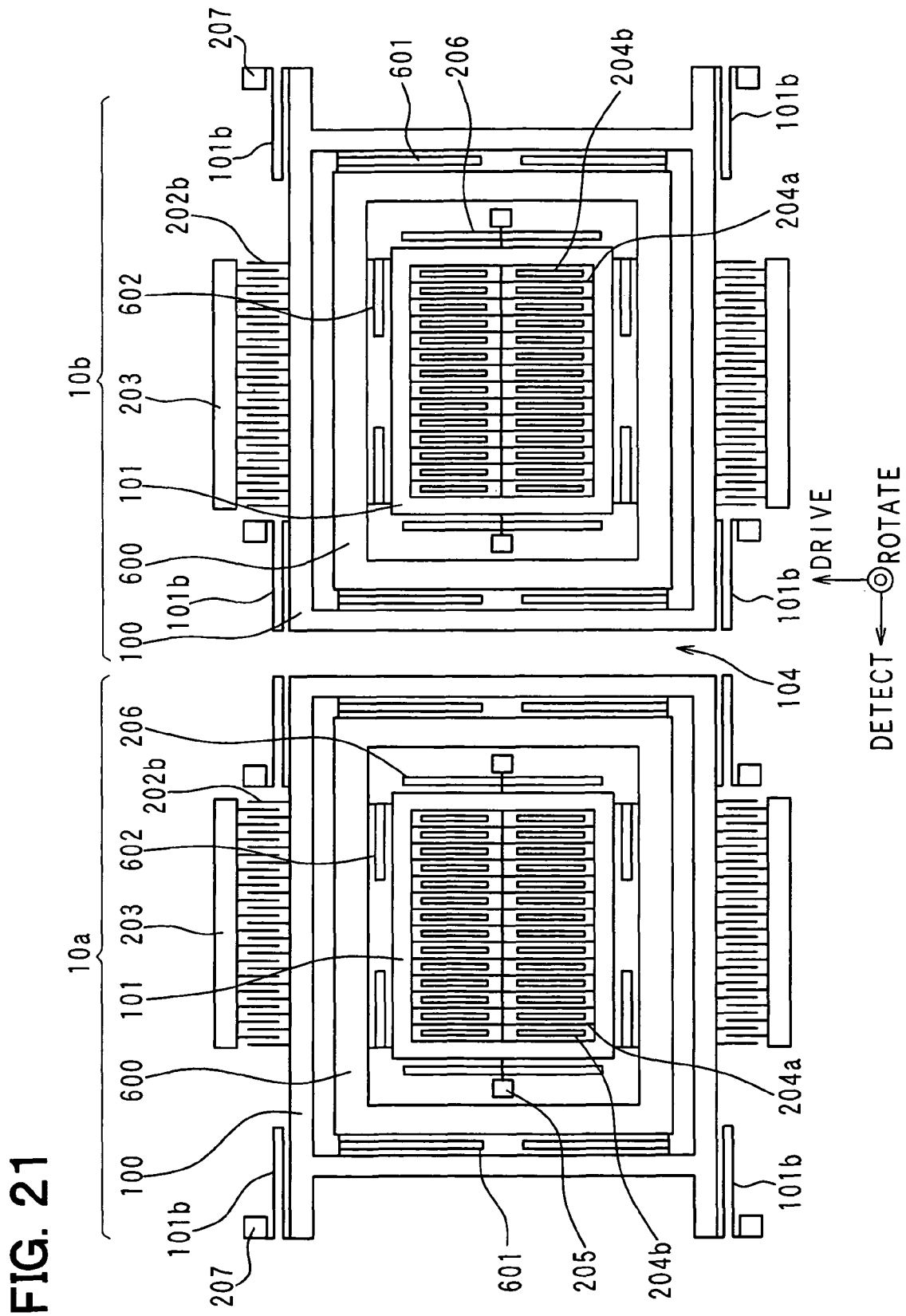
FIG. 21 is a diagram illustrating the top view of the angular velocity sensor of FIG. 20 in which a coupling beam is omitted.

An angular velocity sensor according to an eleventh embodiment of the present invention is described below with reference to FIGS. 20 and 21. FIG. 20 is a top view of the angular velocity sensor, and FIG. 21 corresponds to FIG. 20 from which a coupling beam is removed.

The eleventh embodiment is similar to the second embodiment. A difference between the second and eleventh embodiments is as follows.

According to the eleventh embodiment, the drive weight 100 is supported by the drive beam 101b in such a manner that the drive weight 100 can be displaced in the drive direction. The drive beam 101b is fixed at one end to the drive beam fixing portion 207. Further, a middle weight 600 is supported by a drive middle beam 601. The drive middle beam 601 is joined to an inner wall of the drive weight 100 and has elasticity in the detection direction. The detection weight 101 is supported by a detection middle beam 602. The detection middle beam 602 is joined to an inner wall of the middle weight 600 and has elasticity in the drive direction. Also, the detection weight 101 is supported to the detection beam fixing portion 205 by the detection beam 206. The detection beam 206 has elasticity in the detection direction. Therefore, the middle weight 600 is movable both in the drive direction and in the detection direction, the detection weight 101 is movable in the detection direction, and the drive weight 100 is movable in the drive direction. The drive beam fixing portion 207, the drive beam 101b, the drive weight 100, the drive, middle beam 601, the middle weight 600, the detection middle beam 602, the detection weight 101, and the detection beam fixing portion 205 are joined together in the mentioned order. Thus, the weights 100, 101, and 600 are supported by the drive beam fixing portion 207 located outside the drive weight 100 and the detection beam fixing portion 205 located inside the drive weight 100.

The angular velocity sensor according to the eleventh embodiment works as follows. When the drive weight 100 vibrates in the drive direction, the vibration of the drive weight 100 in the drive direction is transmitted to the middle weight 600 so that the middle weight 600 can vibrate in the drive direction. In this case, since the detection weight 101 is joined to the detection beam 206, the detection weight 101 does not vibrate in the drive direction. Specifically, this is because the detection beam 206 is fixed to the detection beam fixing portion 205 and has elasticity in the detection direction (preferably, no elasticity in the drive direction).

If an angular velocity about an axis extending in the rotation direction is applied during a period of time the middle weight 600 vibrates in the drive direction, the Coriolis force acts on the drive weight 100 and the middle weight 600. In this case, since the drive weight 100 is joined to the drive beam 101b, the drive weight 100 does not vibrate in the detection direction. Specifically, this is because the drive beam 101b is fixed to the drive beam fixing portion 207 and has elasticity in the drive direction (preferably, no elasticity in the detection direction). In contrast to the drive weight 100, the middle weight 600 vibrates (i.e., is displaced) in the detection direction, because the middle weight 600 is joined to the drive middle beam 601 that has elasticity in the detection direction. The displacement of the middle weight 600 in the detection direction is transmitted to the detection weight 101 through the detection middle beam 602 that has elasticity in the drive direction (preferably, no elasticity in the detection direction). Since the detection weight 101 is supported by the detection beam 206 having elasticity in the detection direction, the detection weight 101 is displaced in the detection direction. The displacement of the detection weight 101 is detected by the detection electrode 204. In this way, the Coriolis force is measured based on the detected displacement of the detection weight 101.

Further, according to the eleventh embodiment, the middle weights 600 of the oscillators 10a, 10b are coupled together by the coupling beam 104 that has elasticity both in the drive direction and in the detection direction. Specifically, as shown in FIG. 20, the middle weight 600 has a rectangular frame shape, and the post portion 104a of the coupling beam 104 is joined to a middle point of each side of the middle weight 600. That is, the post portions 104a are arranged such that the center of gravity of a plane defined by connecting all the post portions 104a can coincide with the center of gravity of the middle weight 600. In such an approach, it is less likely that the middle weight 600 is inclined due to the weight of the coupling beam 104.

Thus, the eleventh embodiment, in which the middle weights 600 are coupled together by the coupling beam 104, can have the same advantages as the preceding embodiments, in which the drive weights 100 and/or the detection weights 101 are coupled by the coupling beam 104.

Further, since the coupling beam 104 and the oscillators 10a, 10b are formed at different layers (planes), the angular velocity sensor can be reduced in size. Furthermore, since the drive weight 100 has a rectangular shape, the strength of the drive weight 100 can be improved.

(Modifications)

The embodiments described above can be modified in various ways. In the preceding embodiments, when the drive weight 100 has a rectangular shape, the detection weight 101 is located inside the drive weight 100, or when the detection weight 101 has a rectangular shape, the drive weight 100 is located inside the detection weight 101. Alternatively, the outside weight can have a shape other than a rectangular shape. For example, the outside weight can have substantially a H-shape or a C-shape.

The embodiments can be combined together. For example, the fourth embodiment and the tenth embodiment can be combined together.

The structure of the center spring portion 104e shown in FIGS. 5, 16, and 17 can be applied to the center spring portion 104e shown in FIGS. 1, 7, 11, 12, 18, and 20.

The structure shown in FIG. 10, in which the coupling beam is formed on each side of the element forming layer 3, can be applied to any one of FIGS. 1, 7, 11, 12, 16, 17, 18, and 20.

The structure shown in FIG. 12, in which the coupling beam is formed in the cap substrate, can be applied to any one of FIGS. 5, 11, 16, 17, 18 and 20.

Such changes and modifications are to be understood as being within the scope of the present invention as defined by the appended claims.

What is claimed is:

1. An angular velocity sensor comprising:
   a first unit and a second unit, each including a drive member configured to be driven in a first direction, a detection member configured to move in a second direction perpendicular to the first direction, and an elastic member configured to join the drive member to the detection member; and
   a coupling beam configured to couple a front surface of the drive member of the first unit to a front surface of the drive member of the second unit, wherein
   the first unit and the second unit are arranged side by side in the first direction,
   the drive members, the detection members, and the elastic members of the first unit and the second unit are formed on a first plane parallel to a plane defined by the first direction and the second direction, and
   the coupling beam is located above the first plane.

2. The angular velocity sensor of claim 1, wherein
   each of the drive members of the first unit and the second unit has a rectangular shape,
   the coupling beam is joined to a portion corresponding to the center of gravity of the drive member of the first unit and joined to a portion corresponding to the center of gravity of the drive member of the second unit.

3. The angular velocity sensor of claim 1, further comprising:
   a second coupling beam configured to couple a back surface opposite to the front surface of the drive member of the first unit to a back surface opposite to the front surface of the drive member of the second unit.

4. The angular velocity sensor of claim 1, further comprising:
   a spring member having elasticity in the first direction, wherein
   the coupling beam is fixed through the spring member to a substrate layer on a straight line connecting a junction between the coupling beam and the drive member of the first unit to a junction between the coupling beam and the drive member of the second unit, and
   the substrate layer is located below the first plane.

5. The angular velocity sensor of claim 4, wherein
   the coupling beam, the drive member of the first unit, the drive member of the second unit, and the spring member are electrically connected together.

6. The angular velocity sensor of claim 1, wherein
   the coupling beam has elasticity in the first direction.

7. The angular velocity sensor of claim 1, wherein
   the coupling beam has a portion that is bent in a direction perpendicular to the first direction.

8. The angular velocity sensor of claim 1, further comprising:
   an other coupling beam separate from the coupling beam that couples the drive member of the first unit to the drive member of the second unit, wherein
   the other coupling beam is formed on the first plane and located between the detection member of the first unit and the detection member of the second unit, and
   the detection member of the first unit is coupled to the detection member of the second unit by the other coupling member.

9. The angular velocity sensor of claim 1, wherein
   the coupling beam has a first plurality of portions extending in the first direction and a second plurality of portions joined to the first plurality of portions and extending along the plane defined by the first direction and the second direction to cross the first direction, and
   a length of the first plurality of portions is less than a length of the second plurality of portions.

10. An angular velocity sensor comprising:
    a first unit and a second unit, each including a drive member configured to be driven in a first direction, a detection member configured to move in a second direction perpendicular to the first direction, and an elastic member configured to join the drive member to the detection member; and
    a coupling beam configured to couple a front surface of the detection member of the first unit to a front surface of the detection member of the second unit, wherein
    the first unit and the second unit are arranged side by side in the first direction,
    the drive members, the detection members, and the elastic members of the first unit and the second unit are formed on a first plane parallel to a plane defined by the first direction and the second direction, and
    the coupling beam is located above the first plane.

11. The angular velocity sensor of claim 10, wherein
    each of the detection members of the first unit and the second unit has a rectangular shape, and
    the coupling beam is joined to a portion corresponding to the center of gravity of the detection member of the first unit and joined to a portion corresponding to the center of gravity of the detection member of the second unit.

12. The angular velocity sensor of claim 10, further comprising:
    a second coupling beam configured to couple a back surface opposite to the front surface of the detection member of the first unit to a back surface opposite to the front surface of the detection member of the second unit.

13. The angular velocity sensor of claim 10, further comprising:
    a spring member having elasticity in the first direction, wherein
    the coupling beam is fixed through the spring member to a substrate layer on a straight line connecting a junction between the coupling beam and the detection member of the first unit to a junction between the coupling beam and the detection member of the second unit, and
    the substrate layer is located below the first plane.

14. The angular velocity sensor of claim 13, wherein
    the coupling beam, the detection member of the first unit, the detection member of the second unit, and the spring member are electrically connected together.

15. The angular velocity sensor of claim 10, wherein
    the coupling beam has elasticity in the second direction.

16. The angular velocity sensor of claim 10, wherein
    the coupling beam has a portion that is bent in a direction perpendicular to the second direction.

17. The angular velocity sensor of claim 10, further comprising:
an other coupling beam separate from the coupling beam that couples the detection member of the first unit to the detection member of the second unit, wherein
the other coupling beam is formed on the first plane and located between the drive member of the first unit and the drive member of the second unit, and
the drive member of the first unit is coupled to the drive member of the second unit by the other coupling member.

18. The angular velocity sensor of claim 10, wherein
the coupling beam has a first plurality of portions extending in the second direction and a second plurality of portions joined to the first plurality of portions and extending along the plane defined by the first direction and the second direction to cross the second direction, and
a length of the first plurality of portions is less than a length of the second plurality of portions.

19. The angular velocity sensor of claim 1, wherein
the first unit and the second unit are made of silicon, metal, resin, glass, ceramic, or a mixture of these materials.

20. The angular velocity sensor of claim 1, further comprising:
a first element forming layer where the drive members and the detection members are formed, and
a second element forming layer located to face a region of the first element forming layer, where the drive members and the detection members are formed, wherein
the coupling beam is formed in the second element forming layer and movable in both the first direction and the second direction.

21. The angular velocity sensor of claim 20, further comprising
a SOI substrate having the first element forming layer; and
a gap substrate having the second element forming layer and joined to the SOI substrate to form a sealed space therebetween, wherein
the drive members, the detection members, and the coupling beam are located in the sealed space.

22. An angular velocity sensor, comprising:
a first oscillator having a first drive member movable in a first direction and a first detection member movable in a second direction perpendicular to the first direction;
a second oscillator having a second drive member movable in the first direction and a second detection member movable in the second direction; and
a first coupling beam is coupled between the first oscillator and the second oscillator in such a manner that the first oscillator and the second oscillator vibrate relative to each other in the first direction, wherein
the first oscillator and the second oscillator are arranged side by side in the first direction,
the first drive member and the first detection member of the first oscillator and the second drive member and the second detection member of the second oscillator are formed on a first plane parallel to a plane defined by the first direction and the second direction,
the first coupling beam includes a first post fixed to the first oscillator, a second post fixed to the second oscillator, a first beam portion joined at a first end to the first post, a second beam portion joined at a first end to the second post, and a first spring portion joined at a first end to a second end of the first beam portion and joined at a second end to a second end of the second beam portion,
the first post extends away from a surface of the first oscillator in a thickness direction of the first oscillator,
the second post extends away from a surface of the second oscillator in a thickness direction of the second oscillator,
the first beam portion, the second beam portion, and the first spring portion are spaced from the first plane by a thickness of the first post or the second post,
the first beam portion is coupled through the first post to the first oscillator,
the second beam portion is coupled through the second post to the second oscillator, and
the first spring portion has elasticity at least in the first direction.

23. The angular velocity sensor of claim 22, wherein
the first oscillator and the second oscillator are configured such that the first drive member has a rectangular shape and is surrounded by the first detection member and that the second drive member has a rectangular shape and is surrounded by the second detection member, or the first oscillator and the second oscillator are configured such that the first detection member has a rectangular shape and is surrounded by the first drive member and that the second detection member has a rectangular shape and is surrounded by the second drive member,
the center of gravity of the first drive member of the first oscillator coincides with the center of gravity of the first detection member of the first oscillator,
the center of gravity of the second drive member of the second oscillator coincides with the center of gravity of the second detection member of the second oscillator,
the first post is joined to a portion corresponding to the center of gravity of the first oscillator, and
the second post is joined to a portion corresponding to the center of gravity of the second oscillator.

24. The angular velocity sensor of claim 22, wherein
each of the first drive member and the second drive member includes two first portions having a common longitudinal direction in the first direction and two second portions having a common longitudinal direction in the second direction, ends of the first portions and ends of the second portions being joined to form a frame shape,
the first post is joined to the second portion of the first drive member closer to the second drive member, and
the second post is joined to the second portion of the second drive member closer to the first drive member.

25. The angular velocity sensor of claim 22, further comprising:
a spring member having elasticity in the first direction, wherein
the first coupling beam is fixed through the spring member to a substrate layer on a straight line connecting the first post to the second post, and
the substrate layer is located below the first plane.

26. The angular velocity sensor of claim 25, wherein
the first coupling beam, the first oscillator, the second oscillator, and the spring member are electrically connected together.

27. The angular velocity sensor of claim 12, wherein
the first coupling beam has elasticity in the first direction.

28. The angular velocity sensor of claim 22, wherein
the first oscillator and the second oscillator are made of silicon, metal, resin, glass, ceramic, or a mixture of these materials.

29. The angular velocity sensor of claim 22, wherein
the first coupling beam has a first plurality of portions extending in the first direction and a second plurality of portions joined to the first plurality of portions and extending along the plane defined by the first direction and the second direction to cross the first direction, and a length of the first plurality of portions is less than a length of the second plurality of portions.

30. The angular velocity sensor of claim 22, wherein a first element forming layer where the first oscillator and the second oscillator are formed, and a second element forming layer located to face a region of the first element forming layer, where the first oscillator and the second oscillator are formed, wherein the first coupling beam is formed in the second element forming layer and movable in both the first direction and the second direction.

31. The angular velocity sensor of claim 30, wherein a SOI substrate having the first element forming layer; and a gap substrate having the second element forming layer and joined to the SOI substrate to form a sealed space therebetween, wherein the first oscillator, the second oscillator, and the first coupling beam are located in the sealed space.

32. The angular velocity sensor of claim 22, further comprising:

a second coupling beam coupled between the first oscillator and the second oscillator in such a manner that the first oscillator and the second oscillator vibrate relative to each other in the first direction, wherein the second coupling beam includes a third post fixed to the first oscillator, a fourth post fixed to the second oscillator, a third beam portion joined at a first end to the third post, a fourth beam portion joined at a first end to the fourth post, and a second spring portion joined at a first end to a second end of the third beam portion and joined at a second end to a second end of the fourth beam portion, the third beam portion, the fourth beam portion, and the second spring portion are spaced from the first plane by a thickness of the third post or the fourth post, the third beam portion is coupled through the third post to the first oscillator, the fourth beam portion is coupled through the fourth post to the second oscillator, and the second spring portion has elasticity in the first direction.

33. The angular velocity sensor of claim 32, wherein the first oscillator and the second oscillator are configured such that the first drive member has a rectangular shape and is surrounded by the first detection member and that the second drive member has a rectangular shape and is surrounded by the second detection member, or the first oscillator and the second oscillator are configured such that the first detection member has a rectangular shape and is surrounded by the first drive member and that the second detection member has a rectangular shape and is surrounded by the second drive member, the center of gravity of the first drive member of the first oscillator coincides with the center of gravity of the first detection member of the first oscillator, the center of gravity of the second drive member of the second oscillator coincides with the center of gravity of the second detection member of the second oscillator, the first post and the third post are joined to a portion corresponding to the center of gravity of the first oscillator, and the second post and the fourth post are joined to a portion corresponding to the center of gravity of the second oscillator.

34. The angular velocity sensor of claim 32, wherein each of the first drive member and the second drive member includes two first portions having a common longitudinal direction in the first direction and two second portions having a common longitudinal direction in the second direction, ends of the first portions and ends of the second portions being joined to form a frame shape, the first post is joined to a front surface of the second portion of the first drive member closer to the second drive member, the second post is joined to a front surface of the second portion of the second drive member closer to the first drive member, the third post is joined to a back surface of the second portion of the first drive member closer to the second drive member, and the fourth post is joined to a back surface of the second portion of the second drive member closer to the first drive member.

35. The angular velocity sensor of claim 1, wherein the coupling beam is made of silicon, metal, resin, glass, ceramic, or a mixture of these materials.

36. The angular velocity sensor of claim 1, wherein the coupling beam has an arch shape.

37. The angular velocity sensor of claim 1, wherein the coupling beam has a circular arc shape.

38. An angular velocity sensor comprising:

two sensor units, each sensor unit comprising:

a drive weight movable in a first direction;

a detection weight movable in a second direction perpendicular to the first direction; and a middle weight located between the drive weight and the detection weight, the middle weight configured to move in the first direction when the drive weight moves in the first direction, the middle weight configured to cause the detection weight to move in the second direction when the middle weight moves in the second direction; and a coupling beam configured to couple the middle weights of the sensor units together, wherein the sensor units are arranged side by side in the first direction, the drive weights, the detection weights, and the middle weights of the sensor units are formed on a first plane parallel to a plane defined by the first direction and the second direction, and the coupling beam is located above the first plane.

* * * * *